US012720128B2

(12) United States Patent
Chuah et al.

(10) Patent No.: US 12,720,128 B2
(45) Date of Patent: Aug. 25, 2026

(54) IN-CONTENT ADVERTISING SYSTEM

(71) Applicant: INVIDI Technologies Corporation, Princeton, NJ (US)

(72) Inventors: Nick Chuah, Singapore (SG); Niranjana Krishnaswamy, Princeton, NJ (US); Alden Lloyd Peterson, II, Princeton, NJ (US)

(73) Assignee: INVIDI Technologies Corporation, Princeton, NJ (US)

( * ) Notice: Subject to any disclaimer, the term of this patent is extended or adjusted under 35 U.S.C. 154(b) by 0 days.

(21) Appl. No.: 18/649,732

(22) Filed: Apr. 29, 2024

(65) Prior Publication Data

US 2024/0364946 A1 Oct. 31, 2024

Related U.S. Application Data

(60) Provisional application No. 63/462,901, filed on Apr. 28, 2023.

(51) Int. Cl.
*H04N 21/234* (2011.01)
*H04N 21/81* (2011.01)

(52) U.S. Cl.
CPC ..... *H04N 21/23424* (2013.01); *H04N 21/812* (2013.01)

(58) Field of Classification Search
CPC ............. H04N 21/812; H04N 21/2547; H04N 21/23424; H04N 21/854; H04N 21/2343
See application file for complete search history.

(56) References Cited

U.S. PATENT DOCUMENTS

2006/0265657 A1* 11/2006 Gilley ............ H04N 21/440218 705/14.69
2007/0022032 A1* 1/2007 Anderson .......... G06Q 30/0269 348/E7.071
2008/0059390 A1* 3/2008 Cox ................ H04N 21/44222 706/12

(Continued)

OTHER PUBLICATIONS

International Search Report and Written Opinion, dated Jul. 11, 2024, International Application No. PCT/US24/26869, filed Apr. 29, 2024, 12 pages.

*Primary Examiner* — Jason Salce
(74) *Attorney, Agent, or Firm* — INVIDI Technologies Corporation

(57) ABSTRACT

A system and associated functionality are described for enabling replacement of in-content advertising (ICA) content in programming segments without creating and distributing full program versions. One or more ICA opportunities (702) are provided in a programming stream (700). To enable replacement of less than the whole program, a replaceable program segment (704) is defined that encompasses the one or more ICA opportunities (702). Multiple versions (706) of the programming segment (704) can then be generated each including different ICA content for the ICA opportunity (702). Individual viewers or viewers belonging to different demographic groups or geographic zones, among other possibilities, may then receive an appropriate one of the versions (706) of the programming segment (704). A trigger (708) may be provided at a time prior to the beginning of the programming segment (704) to facilitate or enable insertion of the appropriate version (706).

24 Claims, 11 Drawing Sheets

(56) References Cited

U.S. PATENT DOCUMENTS

2008/0235722 A1* 9/2008 Baugher .............. H04N 7/1675 348/E7.056
2009/0328113 A1* 12/2009 van de Klashorst ........................ G06Q 30/0269 725/87
2010/0010893 A1* 1/2010 Rajaraman ......... H04N 21/4312 705/14.51
2011/0145856 A1* 6/2011 Agarwal .......... H04N 21/25435 725/32
2015/0143416 A1 5/2015 Onno
2016/0142792 A1* 5/2016 Lee ........................ G06V 20/46 725/32
2018/0199089 A1 7/2018 Wilson
2018/0288494 A1 10/2018 Grover
2020/0128284 A1* 4/2020 Parks ................... H04N 21/858
2021/0321170 A1 10/2021 MacDougall

* cited by examiner 400
408
ANALYTICS PROCESSING
406
CAMPAIGN INFORMATION
404
3RD PARTY DATA
402
CDS
411
NETWORK INFORMATION
426
424
VOD
422
HEADEND
432
430
428
412
NETWORK INFORMATION
440
438
436
434
410
420
418
414
NETWORK INFORMATION
416
450
E-COMMERCE OR VENDOR

800

| SEGMENT (802) | VERSION (804) | ICA (X) (806) | ICA (Y) (808) | ICA (Z) (810) |
|---|---|---|---|---|
| A | 1 | $X_1$ | $Y_1$ | $Z_1$ |
| | 2 | $X_1$ | $Y_2$ | $Z_1$ |
| | 3 | $X_1$ | $Y_3$ | $Z_2$ |
| | 4 | $X_2$ | $Y_1$ | $Z_1$ |
| | 5 | $X_2$ | $Y_2$ | $Z_2$ |
| | 6 | $X_3$ | $Y_1$ | $Z_1$ |
| | 7 | $X_3$ | $Y_2$ | $Z_1$ |
| | 8 | $X_3$ | $Y_3$ | $Z_2$ |
| B | 1 | $X_1$ | $Y_1$ | $Z_1$ |
| | 2 | $X_1$ | $Y_2$ | $Z_1$ |
| | 3 | $X_1$ | $Y_3$ | $Z_1$ |
| | 4 | $X_1$ | $Y_4$ | $Z_1$ |
| | 5 | $X_1$ | $Y_1$ | $Z_2$ |
| | 6 | $X_1$ | $Y_2$ | $Z_2$ |
| | 7 | $X_1$ | $Y_3$ | $Z_2$ |
| | 8 | $X_1$ | $Y_4$ | $Z_2$ |

FIG.8A

| SEGMENT | VERSION | ICA (X) | ICA (Y) | ICA (Z) |
|---|---|---|---|---|
| A | 1 | $X_1$ | $Y_1$ | $Z_1$ |
| | 2 | $X_2$ | $Y_2$ | $Z_2$ |
| | 3 | $X_3$ | $Y_3$ | $Z_3$ |
| | 4 | $X_4$ | $Y_4$ | $Z_4$ |

IN-CONTENT ADVERTISING SYSTEM

CROSS-REFERENCE TO RELATED APPLICATION

This application claims priority to U.S. Provisional Patent Application No. 63/462,901 entitled "In-Content Advertising System," filed Apr. 28, 2023, the contents of which are incorporated herein as if set forth in full and priority is claimed to the full extent allowable under U.S. law and regulations.

FIELD OF THE INVENTION

The present invention relates to in-content advertising and, in particular, to enabling addressable in-content advertising for improved audience segmentation and targeting.

BACKGROUND OF THE INVENTION

In recent years, in-content advertising (ICA) has grown in popularity. ICA relates to promotional opportunities that are embedded in content, for example, video programming. Such programming may be distributed via various modalities including broadcast, video-on-demand (VOD), and streaming via data networks, e.g., over-the-top (OTT) content distribution such as via Netflix, Hulu, and other streaming services. Examples of ICA include product placement, where a product appears in a program, background advertising where promotional content is provided in the background of a programming scene, and shoppable content where viewers can use a displayed QR code or other code/link to purchase items appearing in programming or to access product information.

ICA can be inserted during production, for example, by strategic placement of products during filming, or post-production in selected scenes. Post-production ICA has certain advantages including the ability to change advertising over time or geographies as well as the opportunity to use existing order entry platforms to obtain orders from advertisers.

In general, ICA has some advantages over conventional, external advertising. For example, such conventional advertising includes bumper ads, provided before or after video content and interruptive ads delivered in commercial breaks that interrupt programming. Consumers viewing programming in time-shifted modes may be able to skip interruptive advertisements. Other viewers may channel surf or otherwise disengage during commercial breaks. However, viewers cannot avoid ICA without missing a portion of the programming. Moreover, with the emergence of streaming services, some viewers have become less tolerant of interruptive ads. Finally, in some cases, ICA has been viewed as particularly effective due to the positive associations of products and services with popular actors or programming. Advertisers have thus been drawn to ICA as an effective and relatively unobtrusive means of delivering impressions.

However, ICA also presents some challenges. Perhaps most significantly, ICA content is embedded in programming and generally cannot be provided as an independent asset. Rather, ICA content, such as a digitally overlaid image, is generally integrated into the environment of the programming such that it only appears in the position and for the duration that a corresponding object appears in the programming environment. This requires processing to properly integrate the ICA content into the programming environment and limits the advertising opportunity. Solutions have been developed to address this technological challenge, such as the Digital Brand Integration (DBI) products of Whisper Media. However, the ICA opportunities remain qualitatively and quantitatively limited.

Moreover, while such products allow for post-production replacement of ICA content, the flexibility in placing such ICA content is limited. As noted above, significant processing is required to integrate the ICA content into the programming. Accordingly, unlike conventional advertising where advertising breaks can be easily populated with desired ads and combinations of ads, changing the ICA content has generally involved creating and distributing a new version of the programming. For practical reasons, this limits the ability of providers to frequently vary the ICA content and to flexibly contract for ICA content placement. For the same reason, addressable advertising, where different ads are targeted to different audience segments (e.g., based on location, demographics, purchasing behavior, or other segmentations of interest) of particular programming, has generally not been available for ICA content.

In addition, attribution and accounting is problematic in connection with distribution of ICA content. In conventional advertising contexts, standardized spots are sold. Those spots have predefined lengths and predefined positions within a multi-spot break, together with ratings or other information to characterize the audience size and composition. ICA opportunities are less standardized, harder to characterize, and harder to track for attribution/billing in relation to the position, duration, and impact of the opportunities.

SUMMARY OF THE INVENTION

The present invention is directed to a system and associated functionality ("utility") for enabling replacement of ICA content in programming segments without creating and distributing full program versions. In this manner, individual program segments can be replaced to provide flexibility in implementing ICA and revising ICA content over time without requiring generation and distribution of full program versions for each combination of ICA content and for changes over time. The invention also facilitates the provisioning of addressable ICA content within practical processing and bandwidth constraints, as well as attribution and accounting in relation to delivery of ICA content.

In accordance with one aspect of the present invention, a utility is provided for replacing program segments that include ICA content. The program segments are subsets of a program, and the ICA content is a subset of a programming segment. The program segments are one or more portions, less than the whole, of a program. In this regard, a program includes any audio, video, or audiovisual production delivered via a communications network such as a movie, TV shows, radio shows, individual episodes of a series, sports and other live events, and podcasts or other streaming content. The program may be delivered via various networks and modalities such as broadcast networks, data networks, VOD, streaming and the like. The segments each contain one or more ICA opportunities. For example, if the program includes a scene where an object, to be replaced or supplemented with ICA content, appears continuously or intermittently, that scene or a portion thereof may be defined as a segment for purposes of the invention. The scene may include more than one ICA opportunity, e.g., a product placement opportunity and a background advertising opportunity. In such cases, the scene may be treated as a single segment, where the multiple ICA opportunities are marketed and delivered as a unit or may be treated as separate segments.

The utility involves defining an ICA opportunity in a program stream, defining a programming segment containing the ICA opportunity, and selecting ICA content for the ICA opportunity. As noted above, the segment is a portion, less than the whole, of a program. In the case of a video or audiovisual program, the segment may include a series of successive programming frames and the ICA opportunity may be defined by one or more of a time component, e.g., corresponding to frames where the ICA opportunity is present, and an object component, e.g., corresponding to a defined component of the programming content to be replaced with ICA content. It will be appreciated that an areal component, e.g., the size and location of the object, may vary over the course of an ICA opportunity. The utility further involves: selecting ICA content; using the ICA content to modify the programming content, in relation to a programming segment, to provide a first version of the programming segment including the selected ICA content; and, in connection with the ICA opportunity, delivering the programming stream including the first version of the programming segment at one or more user equipment devices. In this manner, the ICA content in a program can be efficiently generated and delivered and can be changed over time as may be desired.

In accordance with another aspect of the present invention, a utility is provided for enabling delivery of addressable ICA content. The utility generally involves delivering a version of a programming segment including selected ICA content and delivering the programming stream including the version of the programming segment to one or more user equipment devices as described above. In this case, however, the ICA content is determined by obtaining classification information associated with the one or more user equipment devices or users and selecting the ICA content based on the classification information. For example, the classification information may relate to a current or other location associated with one or more network users or devices, demographics of one or more network users, purchasing behavior, known or putative interests of one or more network users, or any other parameters of interest to advertisers or combinations thereof. Such information may be accessed from a third-party database (e.g., of a credit agency such as Experian, customer lists, loyalty program participants, and/or census data), inferred from network use, determined based on purchasing behavior, or obtained based on express preferences, among other things. The invention thus facilitates the delivery of addressable ICA content in connection with programming streams.

In accordance with a still further aspect of the present invention, a utility is provided for defining ICA opportunities in relation to programming streams. As described above, multiple versions of a replaceable program segment may be defined to facilitate efficient delivery and changes to ICA content over time. In some cases, a segment may include more than one ICA opportunity, and, in any case, the ICA opportunity or opportunities may have context attributes related to the duration of the ICA opportunities, the nature of the ICA opportunities (e.g., product placement or background advertising, type of product, program association, etc.), the position of the ICA opportunities, and others. It is desirable to define the ICA opportunities such that advertisers can evaluate the opportunities and/or ICA content can be delivered in the correct ICA opportunity. Thus, in accordance with the present aspect of the present invention, a utility involves identifying ICA opportunities in one or more programming streams, parsing the programming stream to include stream segments, each including one or more ICA opportunities, and identifying each said ICA opportunity, for purposes of orders or ICA content insertion, with at least first information identifying a stream segment and second information concerning a context attribute of the ICA opportunity. Advertisers can thus assess the value of the ICA opportunity to facilitate development of a dynamic marketplace. In addition, ICA opportunities can be efficiently identified to facilitate accurate and efficient delivery of ICA content.

In accordance with a further aspect of the present invention, a programming stream is modified to enable accurate and efficient delivery of ICA content. An associated utility involves identifying a programming stream including one or more ICA opportunities, parsing the stream to include one or more stream segments, each including one or more ICA opportunities, and inserting into the programming stream at least one trigger identifying an associated programming segment. For example, the trigger may be provided prior to the beginning of the segment and may include information to assist an insertion device in inserting ICA content in connection with the segment. For example, a selected version of the segment may be inserted to replace a default segment or the ICA content may otherwise be inserted. The nature of the trigger can vary depending on the network environment and insertion device. For example, cue information, such as SCTE 35 cues, may be provided in broadcast television streams or metadata may be provided for VOD and streaming applications.

In accordance with a still further aspect of the present invention, a utility is provided for tracking delivery of ICA content. The utility involves monitoring, at a user equipment device, delivery of a programming stream including at least one ICA opportunity. Based on the monitoring, an ICA content delivered in connection with the ICA opportunity is determined. A report concerning the delivered ICA content is then generated and transmitted from the user equipment device to a network tracking platform. The monitoring may involve identifying a version of the segment of the programming stream and/or identifying the ICA content inserted at the user equipment device. Delivery of the segment or ICA content may further be monitored, e.g., by Automatic Content Recognition or identifying any tune-away or skip events, to determine information regarding a quality and/or a quantity of the content delivery. The report may identify at least the ICA content delivered and a streaming context, e.g., a program association, a segment identifier, and/or a programming network/source. The report may further include information concerning consumption of the ICA content, tune-away or skip events, and/or a duration or other attribute of the content delivery.

BRIEF DESCRIPTION OF THE DRAWINGS

For a more complete understanding of the present invention and further advantages thereof, reference is now made to the following Detailed Description, taken in conjunction with the drawings, in which:

FIGS. 8A-8B show tables illustrating options for delivering programming segment versions in accordance with the present invention.

DETAILED DESCRIPTION

Figure 1:
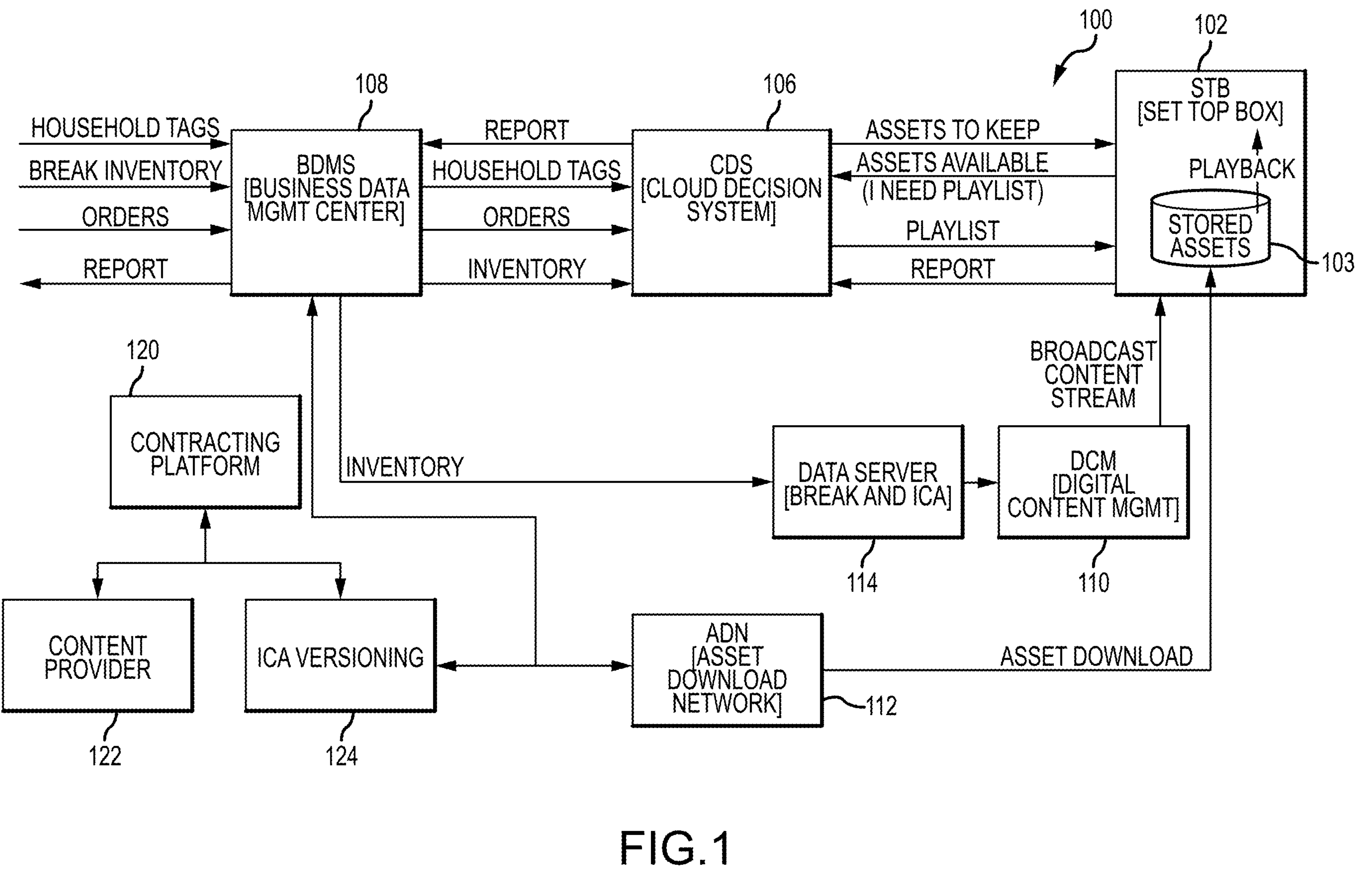
FIG. 1 is a schematic diagram of an addressable asset system in accordance with the present invention.

In the following description, the invention is primarily set forth in the context of addressable asset systems for selecting and delivering programming segment versions including ICA content, sometimes referred to as "assets" below, in television (broadcast, on-demand, streaming, etc.) and other networks. The assets may be programming segment versions including, for example, product placement content, where a product appears in a program, background advertising where promotional content is provided in the background of a programming scene, shoppable content where viewers can use a displayed QR code or other link to purchase items appearing in programming or access product information or other ICA content. While the following description focuses on advertising contexts such as product placement advertising, it will be appreciated that ICA content also encompasses public service or other information placed in programming content.

The invention is described in relation to implementations where the asset decisioning system for selecting assets is independent of (is not dependent on) the content delivery systems and asset download systems of the network. In addition, in certain embodiments, the invention is described in relation to monitoring asset delivery and making asset delivery decisions in addressable-asset environments involving multiple devices, multiple networks, and/or multiple modalities. However, the invention is not limited to such contexts, e.g., certain aspects of the invention are advantageous even in the context of managing and monitoring asset delivery for a single device, network, or modality or in connection with asset decisioning systems that are integrated with or dependent on the programming and asset delivery systems.

As described below, the inventive system can be used to select and deliver programming segment versions in a manner generally corresponding to selecting and delivering addressable assets in an addressable asset delivery system. Addressable asset delivery systems are described in the following U.S. patents and applications ("the Addressable Asset Delivery cases") that are incorporated herein by reference: U.S. patent application Ser. No. 09/877,718, entitled "Targeted Impression Model for Broadcast Network Asset Delivery," ("the Invidi I application"); U.S. patent application Ser. No. 11/331,835, entitled "Targeted Impression Model for Broadcast Network Asset Delivery," and now issued as U.S. Pat. No. 8,108,895 ("the Invidi II application"); U.S. patent application Ser. No. 14/949,442, entitled "Targeted Impression Model for Broadcast Network Asset Delivery" ("the Classifier application"); U.S. patent application Ser. No. 12/024,696, entitled "Targeting Content Based on Location," and now issued as U.S. Pat. No. 8,850,473 ("the Location application"); U.S. patent application Ser. No. 12/024,714, entitled "Compensating for Ad-skipping in a Communications Network" ("the Asset Skipping application"); U.S. patent application Ser. No. 12/467,890, entitled "Compensating for Ad-skipping in a Communications Network," and now issued as U.S. Pat. No. 8,146,126 ("the Request for Information application"); U.S. patent application Ser. No. 12/022,209, entitled "Asset Targeting System for Limited Resource Environments," and now issued as U.S. Pat. No. 7,849,477 ("the Limited Resource application"); U.S. patent application Ser. No. 13/870,870, entitled "Third Party Data Matching for Targeted Advertising," ("the Third Party Data Matching application"); U.S. patent application Ser. No. 13/673,869, entitled "Targeted Advertising in Unicast, Multicast and Hybrid Distribution System Contexts" ("the Multicast application"); U.S. Pat. No. 10,523,992, entitled "Cloud-Based Decisioning for Addressable Asset System ("the Cloud-Based Decisioning patent"); and U.S. Pat. No. 11,222,062, entitled "Universally Interactive Request for Information" ("the RFI patent"). While the present invention sets forth, among other things, alternate decisioning systems, asset delivery networks and protocols, and asset management and monitoring functionality, the above-noted patents and applications disclose structure, functionality, and considerations that are relevant to the present invention. Those include, by way of example, subject matter related to identifying a current user or classification parameters thereof, matching classification parameters to targeting constraints, reporting delivery of assets, determining user presence and engagement, and identifying asset skip or tune-away events among others.

The invention is first described below in connection with various exemplary ICA contexts. An exemplary system architecture is thereafter described including an independent asset decisioning system. The architecture is described in relation to exemplary implementations for managing and monitoring a single device or multiple devices in a single network. Thereafter, a system is described for managing and monitoring asset delivery in a multi-network environment. Finally, various use cases for the inventive systems are described.

I. ICA Contexts

Figure 6:
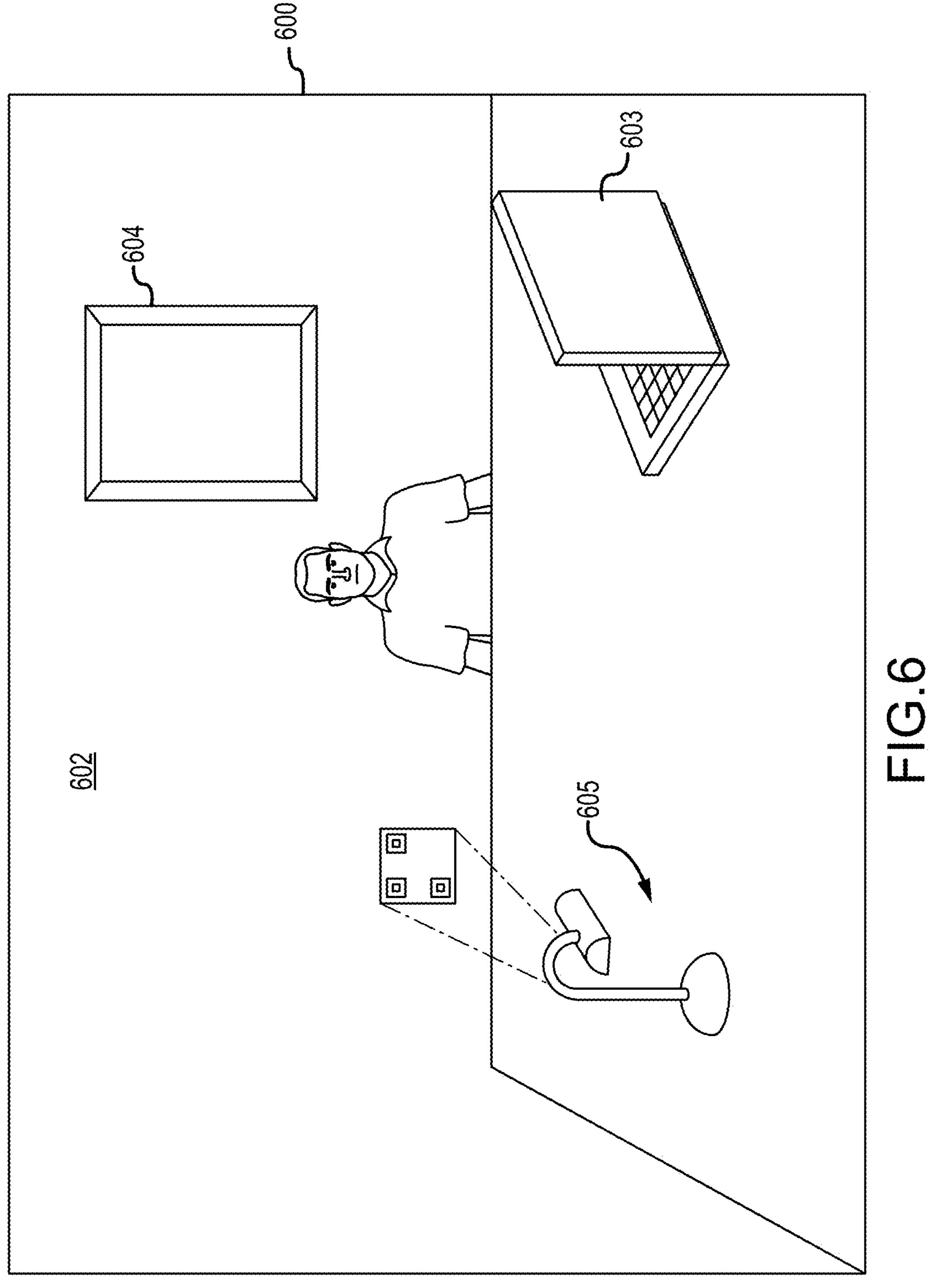
FIG. 6 shows a screen displaying a scene including multiple ICAs that may be populated with ICA content in accordance with the present invention.

FIG. 6 illustrates certain examples of ICA content. Specifically, a screen 600 is shown displaying a scene 602 of programming including certain ICA opportunities 603-605. For example, screen 600 may be a television screen, a laptop or desktop screen, a telephone or tablet screen, or a screen of another user equipment device. The programming may be distributed, for example, via a broadcast network or data network and may be broadcast, unicast, or multicast. A scene 602 may be a scene of a pre-recorded or live dramatic program (e.g., a movie, TV show, podcast, or the like) but also encompasses live or prerecorded sporting events, political events, and news coverage, among other things. Although video programming is depicted, certain aspects of the inventive system are applicable to audio or other programming. While FIG. 6 depicts multiple ICA opportunities 603-605 in a single scene 602 and even in a single frame of content, it will be appreciated that ICA opportunities may be temporally overlapping (concurrently presented at least in part) or not overlapping with respect to a given frame or scene and may be spatially/areally separate or interfering.

Many different types of ICA opportunities are possible including ICAs implemented in audio, visual, or full-motion video content. The illustrated ICA opportunities include a product placement ICA 603, a static or dynamic background ad 604, and shoppable content 605. The product placement ICA 603 includes a product that appears in the scene 602. Although many different types of products may be advertised via product placement, the illustrated ICA 603 depicts a laptop computer. The ICA 603 may include visible trademarks, trade dress, or other insignia or branding of an advertiser. The background ad 604 may include explicit advertising information, for example, concerning a product, event, or other subject matter. For example, the background ad 604 may be presented in a billboard, banner, panel, poster, framed artwork, or other object appearing in the background of a scene 602. In the illustrated example, the ICA opportunity 604 is presented in connection with a poster or framed picture in the background of the scene 602. In other contexts, for example, a live sporting event, digital content may be inserted that appears as if it were physical advertising panels or billboards at the event venue.

ICA opportunity 605 is an example of shoppable content. Shoppable content may be content displayed in a scene 602 that is associated with a code or link to facilitate immediate or delayed access to an e-commerce platform to obtain information about and/or purchase the depicted product or another product/service. For example, the code or link may include a QR code, an alphanumeric code, and icon, a keyword or phrase, or other information. The code or link may be continuously apparent in the scene, transiently or intermittently apparent, or may appear upon some action of the user such as positioning a cursor in the area of the shoppable content. In the case of a QR code, a viewer may use a phone, tablet, or the like (e.g., the user equipment device delivering the programming or a second screen device) to capture the QR code and shop on the user equipment device or a second screen device concurrent with the programming. Alternatively, a viewer may use a remote-control device, the user equipment device, or a second screen device to enter an icon, QR code, or other code to select the ICA for later consideration (e.g., to be accessed via a DVR, web portal, or advertiser site) as described, for example, in the RFI patent. It will thus be appreciated that a variety of ICA types may be supported by the inventive system and that the ICA opportunities may be associated with defined areal portions of content frames. It will be appreciated that such areal portions of ICA opportunities can change in size and position depending, for example, on cinematographic factors such as camera angle, range, and field of view.

Figures 7A, 7B:
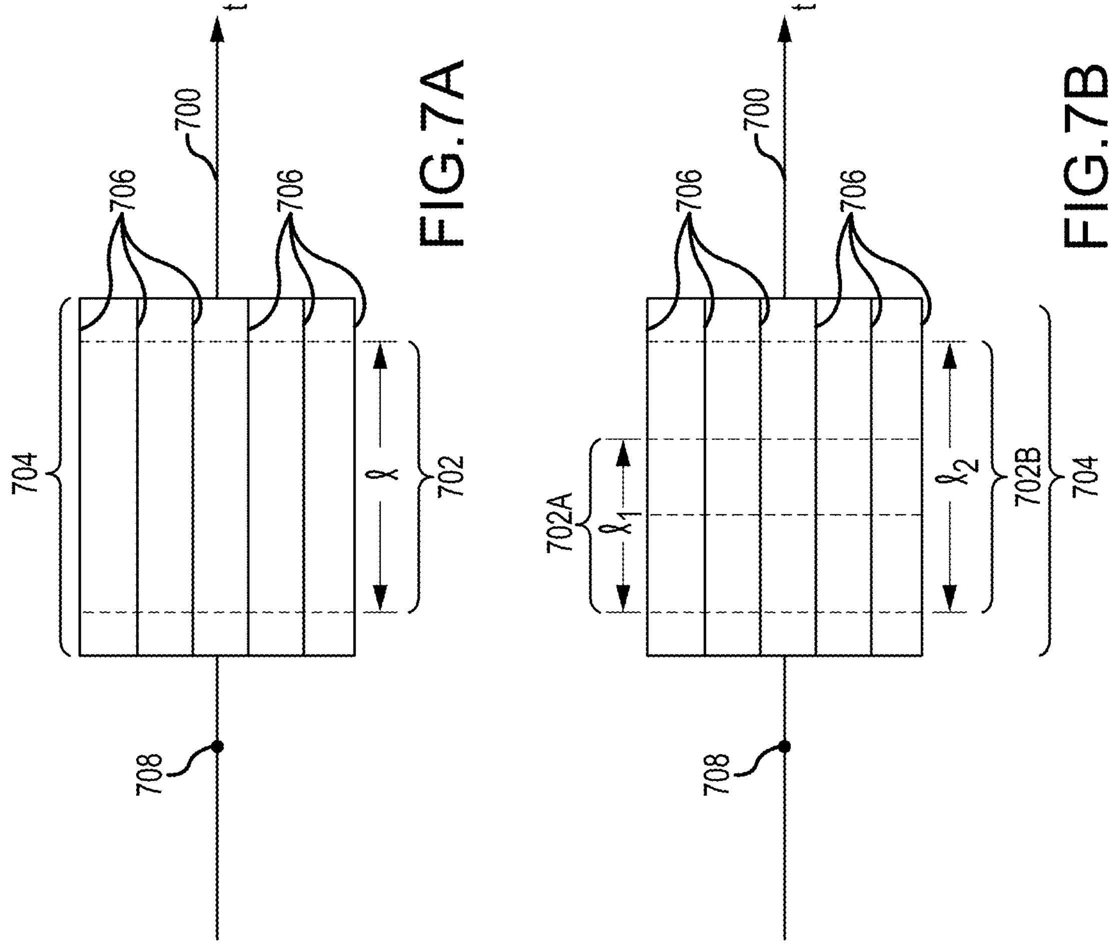
FIGS. 7A-7D illustrate various ICA contexts that may be addressed in accordance with the present invention.

In addition, the ICA opportunities may be defined in relation to their temporal components and grouping. FIG. 7A shows a simple case—a single replacement, single ICA opportunity context—where multiple programming segment versions including different ICA content options are provided for a single ICA opportunity, e.g., corresponding to appearance of a product of an advertiser in a scene. As shown, an ICA opportunity 702 having a temporal length, 1, is provided in a programming stream 700. In accordance with the present invention, a replaceable program segment 704 is defined that encompasses one or more ICA opportunities 702. Multiple versions 706 of the programming segment can then be generated each including different ICA content for the ICA opportunity 702. Individual viewers or viewers belonging to different demographic groups or geographic zones, among other possibilities, may then receive an appropriate one of the versions 706 of the programming segment 704 as described below. A trigger 708 may be provided at a time prior to the beginning of the programming segment 704 to facilitate or enable insertion of the appropriate version 706. Each of these elements will be described in turn below.

The definition of the segment 704 may be influenced by various factors. First, the segment 704 may be defined in relation to the appearance of a cognizable ICA opportunity. Though such an opportunity may be an audio, visual, or full-motion video opportunity, the present discussion will focus on a visual advertising opportunity for purposes of illustration. Due to the nature of the programming, a given location within a scene corresponding to an ICA opportunity, may be continuously or intermittently visible. Moreover, continuity may require that a given object have a consistent appearance whenever it is visible in a scene (for example, this may be true for product placement but not necessarily true for background advertising). Thus, the scene structure of the programming may dictate certain parameters of the ICA opportunity.

Technical considerations may also influence the definition of the segment 704. It will be appreciated that the segment 704 need not be coextensive with the ICA opportunity and may, for example, be longer than the ICA opportunity. Alternatively, multiple segments 704 may be used to service a single ICA opportunity, for example, if an object is intermittently apparent in programming. In any case, it may be desired to switch from the main programming stream to the segment version 706 (and back) at a time different than the beginning (and end) of an ICA opportunity. For example, the beginning and/or end of a programming segment may be selected to correspond to a scene change, camera angle change, or the like, to eliminate or obscure any artifact related to switching between the main programming stream 700 and a segment version 706 and back. The segment versions 706 may have the same length to simplify insertion and related instructions.

ICA opportunities may also be defined in relation to programming that is particularly desirable for ICA, for example, based on ratings, actors, or intangible factors, or due to the presence, prominence, and duration of potential ICA opportunities. The providers of ICA products, such as Whisper Media, may work with content owners and advertisers to identify programming and ICAs to be addressed. The inventive system can then define corresponding ICA opportunities by various parameters such as the program association, the associated segment, and/or an identifier for the ICA opportunity within the segment.

The segment versions 706 will generally, but not necessarily, be identical programming segments with different content in the ICA opportunity or opportunities. It would be possible to generate multiple versions of the segments 706 with different ICA content during production, e.g., via filming alternate programming segments or executing digital content replacement during the original production process. However, it is expected that practical implementations will generate the alternate versions 706 in a post-production process. As noted above, various companies including Whisper Media have developed or are developing products for digitally modifying programming to integrate ICA content into the real environment of the programming. It will be appreciated that such products can be employed to generate multiple versions of a programming segment each with different ICA content or combinations thereof.

The different segments may be used to implement addressable advertising for ICA in a manner similar or identical to addressable advertising for ads delivered during commercial breaks as discussed in the Addressable Asset Delivery cases, among other places. Some examples of use cases in this regard include: providing geographically targeted ICA (e.g., local ads) in programming having a larger (e.g., national) distribution; providing different ICA content to different households or individuals based on demographics, interests, purchasing behavior, or the like; providing ICA by matching a user or user equipment device location to a defined geographic zone (e.g., a congressional district, dealership boundary, census zone, etc.); and delivering ICA content to a list of recipients (e.g., based on a customer lists, automobile intender lists, or other list generated from a credit agency or other third-party database).

Various mechanisms can be employed to deliver the desired programming segment version, including the appropriate ICA content, depending on the network environment and implementation. For example, in the context of a broadcast television network, e.g., cable or satellite television, potential implementations include channel hopping, certain multiplexing implementations, forward-and-store, and asset delivery network implementations, among others. These technologies can be implemented at the user equipment device (optionally under the direction of a remote network platform) or at a network platform remote from the set top box (server-side insertion). In channel hopping implementations, different versions of the segment 704 may be inserted on different asset channels (one of which may be the programming channel) in synchronization with the programming channel stream. A desired segment including the appropriate ICA content may then be delivered at the user equipment device (e.g., a television/set-top box) by switching to the appropriate asset channel at the beginning of the segment and switching back to the programming channel at the end of the segment. Similarly, other multiplexing technologies may allow for multiple versions to be multiplexed into the programming channel and/or other available bandwidth.

In forward-and-store implementations, a desired programming version may be transmitted ahead of time and stored at the user equipment device, e.g., in DVR or other storage. The user equipment device is then operative to insert the desired segment at the appropriate time by switching the content source between the programming stream and content played from storage.

In asset delivery networks, as will be described in more detail below, the programming stream and programming versions or assets may be delivered via separate networks. For example, the programming stream may be broadcast via a cable television network and the programming versions may be delivered via an IP network, e.g., the Internet. The programming versions may be delivered ahead of time or in substantially real-time to be played in the segment's time slot (though perhaps delivered via asynchronous mode). For example, immediately prior to a programming segment, a user equipment device may request a playlist and receive a programming version (or instructions to play a previously stored programming version) via an asset delivery network separate from the programming network or otherwise from a remote asset decisioning system.

In VOD contexts, including VOD implemented in broadcast networks or other streaming environments, insertion of the appropriate versions of one or more programming segments may be implemented at a network platform remote from the user equipment device. For example, a user may request VOD programming content from a streaming application/remote network platform. In response, the remote platform may identify the user (e.g., via a MAC address, login identity, etc.) and access demographic, audience segmentation, or other classification information for the user, match that classification information to targeting parameters of the various programming segment versions to select an appropriate version or versions, and transmit the programming stream including the selected version(s) to the user equipment device for delivery to the user.

The trigger 708 identifies the upcoming segment 704 and/or ICA opportunities 702 to assist the insertion device (e.g., the user equipment device or a server-side insertion device) in accurately inserting the desired version 706. In this regard, the content of the trigger may depend, in part, on the nature of the network and the specific implementation. For example, in a broadcast television network, the trigger 708 may be provided as a cue message or tone such as an SCTE 35 cue. In the case of VOD, appropriate metadata such as messaging via CableLabs Metadata 1.1 may be employed. Similar messages including metadata may be provided in other data networks. In any case, the trigger 708 may include or reference information sufficient to enable selection and delivery of the correct segment version 706 for the segment 702. The content of the trigger 708 will be discussed further below after describing additional exemplary segment replacement contexts.

FIG. 7B shows a single segment replacement context involving multiple ICA opportunities. That is, as described above, the illustrated context involves a single segment 704 of programming stream 700 identified by a trigger 708. Further, multiple versions 706 are available for the segment 704 as described above. However, in this case, the segment 704 includes a first ICA opportunity 702A, having a length 11, and a second ICA opportunity 702B, having a length 12. In this case, the ICA opportunities 702A and B are processed as a group such that, for any given version 706, the same combination of ICA content will be provided for the first and second opportunities 702A and B. Although the ICA opportunities 702A and B are shown as overlapping, it will be appreciated that ICA opportunities may be grouped even where they are temporally distinct.

Such grouping of ICA opportunities may be implemented, for example, to simplify processing, accommodate segments defined for cinematographic reasons, reduce switching between content sources, or to accommodate a desired range of targeting where the ICA opportunities overlap. Marketing of the ICA opportunities in this context can be implemented in various ways. For example, targeting may be restricted to a limited set of targeting parameters such as gender and a limited number of age brackets. If there are sufficient segment versions available to encompass all permutations of the supported values for these targeting parameters, each user equipment device can deliver the version that exactly matches the classification parameters of the user equipment device or audience. If there are not sufficient versions available to support all such permutations, an appropriate algorithm can be implemented to select a best match. Similarly, if the targeting parameters of each ICA opportunity 702 A or B are not narrowly limited, an aggregate best fit for the ICA opportunities 702A and B can be selected for each user equipment device or audience. In such cases, rules may be developed for pricing with respect to the ICA content delivered based on how well the classification parameters match the targeting parameters for each ICA opportunity 702A and B.

Figure 7C:
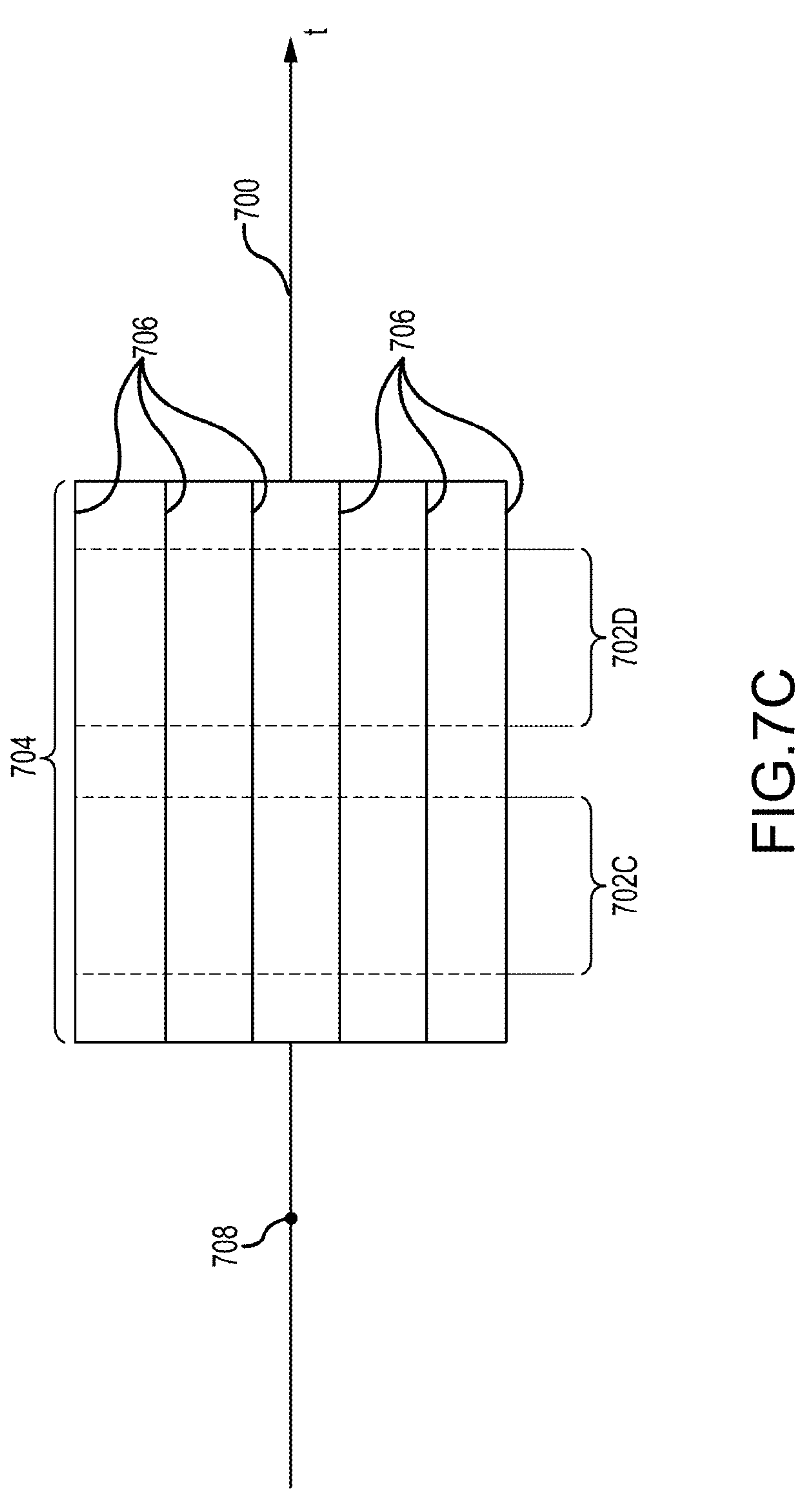

FIG. 7C illustrates a multiple replacement segment. In this case, a single segment 704 of programming stream 700 including multiple asset delivery opportunities 702C and D are identified by a trigger 708 similar to the context described above in connection with FIG. 7B. However, in this case, the user equipment device is not limited to delivering a single version 706 throughout the segment 704 to thereby provide a single combination of content for the opportunities 702C and D. Rather, a given device can select a first segment 706 for opportunity 702C and another segment 706 for opportunity 702D. For example, the device may switch between delivering a first segment and delivering a second segment at the end of opportunity 702C, at the beginning of opportunity 702D, or at some other point therebetween. It is expected that practical applications will involve opportunities 702C and D that do not temporally overlap. However, multiple replacement may be possible for overlapping opportunities where at least one of the opportunities is dynamic (e.g., if one of the opportunities is a static product placement opportunity but another is a dynamic background billboard).

Figure 7D:
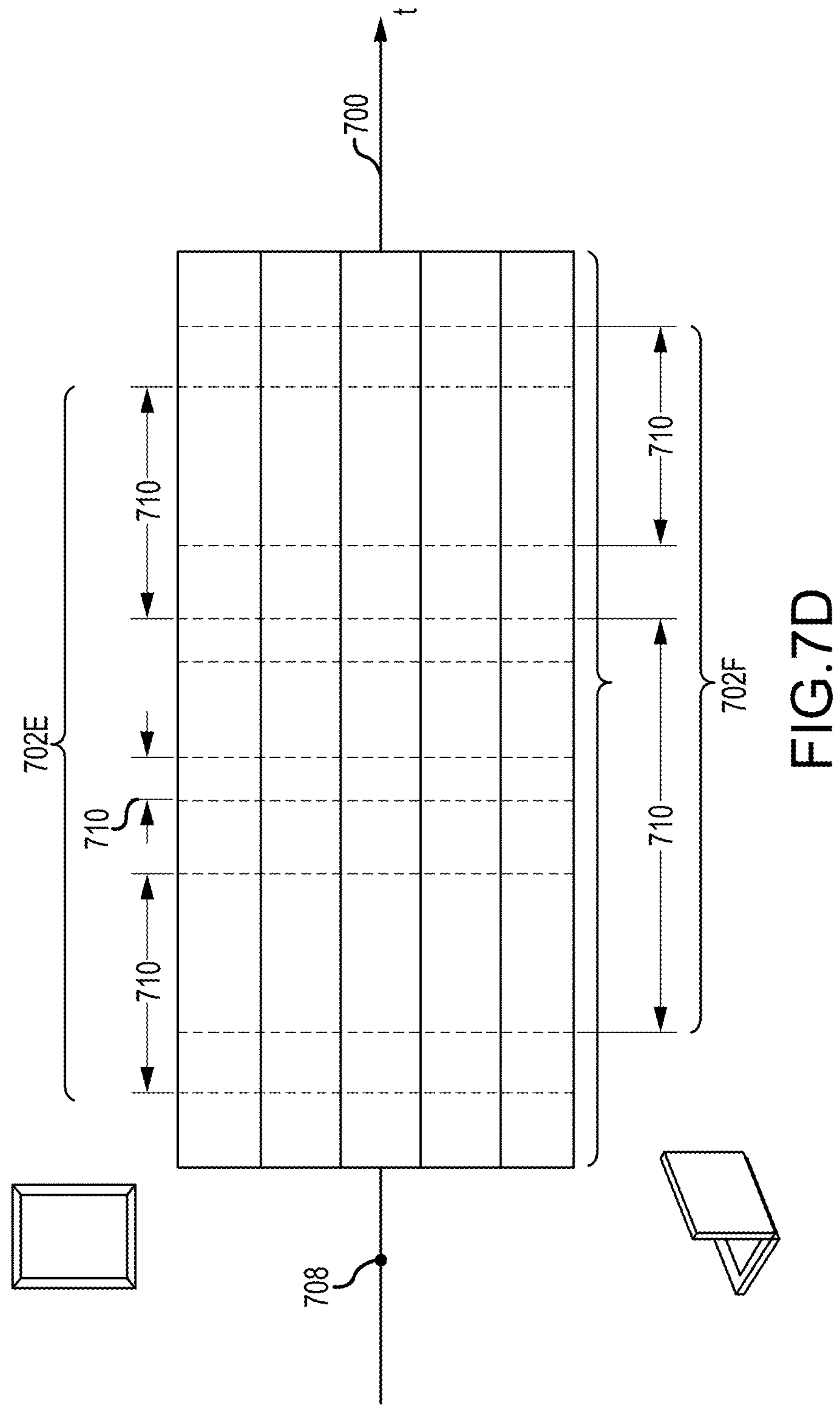

FIG. 7D illustrates ICA opportunities defined by intermittent ICA segments. In this case, a single segment 704 of programming stream 700 identified by trigger 708 includes multiple asset delivery opportunities 702E and F, which may correspond to, for example, opportunities 603 and 604 of FIG. 6. Those opportunities 702E and F each correspond to intermittent time periods 710 where the ICA content is apparent, for example, due to changes in scene, camera angle, or the like. It will be appreciated that the time segments 710 may be treated as a single ICA opportunity or multiple ICA opportunities. In cases where they are treated as multiple opportunities (e.g., associated with multiple segments 704 and potentially multiple triggers 708), marketing rules may be enforced to market the opportunities as a package, e.g., where continuity is required for product placement or other ICA content.

FIG. 8A is a table 800 illustrating certain examples allocating limited segment versions 804 as between multiple ICA content options for multiple ICA opportunities. In this case, two different allocation options are shown for two different segments, segment A and segment B. Each segment is assumed to have three different ICA opportunities; ICA (X) 806, ICA (Y) 808, and ICA (Z) 810. Each of these ICA opportunities is assumed to have multiple content options ($X_{1-3}$, $Y_{1-4}$, and $Z_{1-2}$). Moreover, it is assumed that the system is limited to eight distinct segment versions 804 for each of the segments A or B. For example, the number of available segment versions may be limited due to bandwidth, processing, storage, or marketing constraints. Under these assumptions, it will be appreciated that not every permutation of content options for the ICA opportunities can be supported by the available versions.

For segment A, there is no obvious pattern for the content combinations selected for each available version. Indeed, content option $Y_4$ is not supported. Moreover, the various content options for ICA (X) and ICA (Y) are not evenly distributed. Such a pattern may result, for example, if the combinations of content options for the versions are selected based on the combinations that have the highest estimated delivery value.

For segment B, only content option $X_1$ is supported for ICA (X) and only content options $Z_1$ and $Z_2$ are supported for ICA (Z). However, given these limitations for ICA (X) and ICA (Z), every permutation of combinations of content options is supported including all of options $Y_{1-4}$ for ICA (Y). Such an allocation of the versions may be implemented where it is deemed more important to support multiple versions for certain ICA opportunities than for others for economic or other reasons.

Figure 8B:
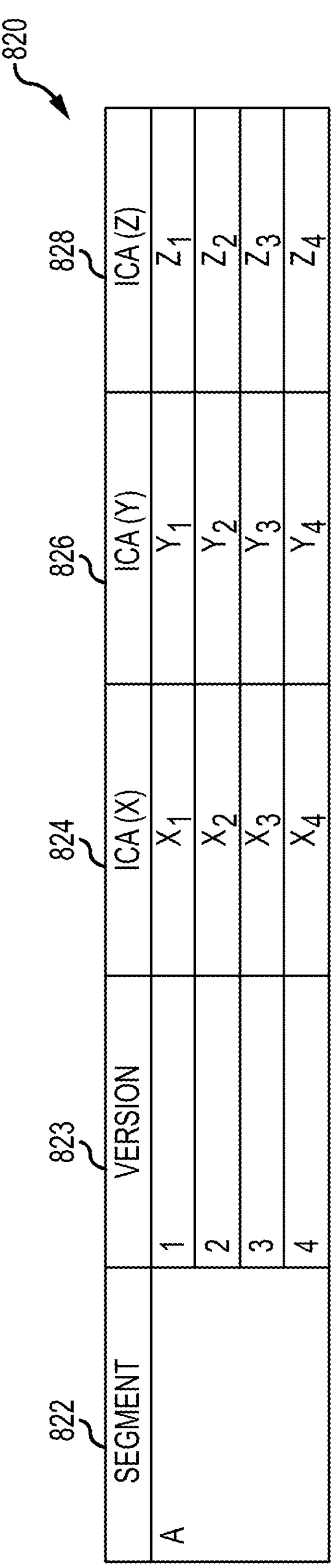

FIG. 8B shows a similar table 820 but for a multiple replacement context as described above in connection with FIG. 7C. In this case, programming segment A is supported by four segment versions 823. However, the user equipment device or other insertion device can switch between the versions for each of the ICA opportunities; ICA (X) 824, ICA (Y) 826, and ICA (Z) 828. As shown, the four versions 823 can thereby support every permutation of $X_{1-4}$, $Y_{1-4}$, and $Z_{1-4}$.

Referring again to FIGS. 7A-7C, it will be understood that the content of the trigger 708 will also depend, in part, on the replacement context and implementation. In the case of a single replacement context (e.g., a single ICA opportunity or multiple ICA opportunities handled as a group) for a channel hopping implementation in a broadcast television network, the trigger 708 may include timing information (segment start time and segment end time) as well as information identifying the segment versions 706. For example, the information identifying the segment versions may include, for each version 706, the asset channel and the segment version, the targeting parameters for the segment version, and/or the classification parameters of the targeted audience. In the case of, for example, a list of viewers for a given version, a list may be sent separately to all or targeted user equipment devices and a trigger 708 may reference the list. In forward-and-store implementations for a broadcast television network, the trigger 708 may include similar information but with an asset identifier or storage location replacing the asset channel identifier. In the case of a multiple replacement context (see, e.g., FIG. 7C), the trigger 708 may identify timing information (start time and end time for each ICA segment and/or any intermediate switching times) and version information indexed to the ICA opportunities.

In asset delivery network implementations (for broadcast television, streaming, etc.), the trigger 708 may include timing information and an identifier for the segment 704 or ICA opportunity. In response to trigger 708, the user equipment device may transmit the identifier for the segment or ICA opportunity in a playlist request to a remote platform embodying an asset decisioning system. Optionally, the request may include other information, for example, identifying an audience at the user equipment device, available versions, and, to the extent not otherwise encoded or reflected in the other information provided, a current programming channel. In response, the asset decisioning system platform may provide a playlist identifying the version or versions to be played for the segment and may further transmit the assets if they have not previously been provided to the user equipment device.

In the case where segment versions are multiplexed into the programming stream or other available bandwidth, the trigger 708 may identify the location of the segment versions in the multiplex or other bandwidth. In certain remote platform implementations, the trigger 708 may include a list (or reference to a separately transmitted/stored list) that directs each user equipment device as to what segment version to deliver. It will be appreciated that many other implementations are possible to enable an insertion device to insert the correct segment versions.

II. System Architecture

As noted above, the inventive system for dynamically replacing programming segments with selected versions including desired ICA content may be implemented in a manner similar to addressable asset delivery systems used to deliver addressable ads in interruptive programming breaks. Certain implementations of such a system are described below.

A. Single Device

FIG. 1 illustrates an addressable asset system 100 in accordance with the present invention that manages and monitors asset delivery with respect to individual User Equipment Devices (UEDs) 102. Although only one UED 102 is illustrated, and the management/monitoring functionality is implemented on a per UED basis, the network would generally include many UEDs. As will be understood from the description in the sections below, the invention is applicable with respect to a variety of types of UEDs in various networks utilizing various modalities. In the illustrated embodiment, the UEDs 102 are televisions, for example, associated with a cable or satellite television network.

As will be understood from the description below, the UEDs 102 are capable of receiving, decoding, and displaying a selected band of a broadcast content stream (e.g., a digital stream including one or more programming channels) and accessing a data platform to download asset files (e.g., digital media files) for storage in a storage unit 103 of the UED 102. The UED 102 may also be capable of accessing on-demand or streaming video content from the broadcast network or a data network such as the internet. The UED 102 may thus be embodied in one or more machines such as a smart television, a set top box, a DVR, an external computer and/or an external storage device. The storage unit 103 may include disk drives, solid state storage devices or other storage structure. The UEDs 102 can deliver assets in connection with broadcast, on-demand, and streaming programming with suitable adjustments, e.g., to identify asset delivery opportunities (ADOs) such as ad breaks or ICA opportunities.

It will be appreciated that the ability to deliver addressable assets in connection with broadcast networks is advantageous due to both the value of asset delivery in these networks and the difficulty of delivering addressable assets in connection with the broadcast mode. Addressable asset systems generally allow for delivery of selected assets for individual UEDs, users, or groups of users based on classification parameters of those users which may include, for example, demographic attributes; psychographic attributes; a present residence or other location of a user; income; purchasing behavior or other financial information of a user; viewing, browsing or other network behavior; interests or other lifestyle factors; or other parameters of interest to an asset provider, network provider, sociologist, researcher, or other interested party. In some implementations, assets can be selected for individual users based on matching targeting constraints and other campaign specifications for an asset to classification parameters and impression information of the user or UED. Such assets may be traditional television advertisements or ICA such as product placement, background advertising, or shoppable content.

However, it will be appreciated that the invention is not limited to such addressable asset contexts. For example, while executing decisions for asset delivery, e.g., to take into account campaign specifications such as frequency and total impression count, may involve device level insertion functionality, such execution does not necessarily entail matching of classification parameters to corresponding asset targeting constraints. Asset providers may desire that even untargeted assets are delivered in accordance with certain campaign specifications, e.g., related to frequency, overall impression count or sequencing of related assets.

Returning to FIG. 1, the illustrated system 100 includes, in addition to the UEDs 102, a cloud decisioning system (CDS) 106 and a business data management system (BDMS) 108. The BDMS 108 generally collects a variety of information that is used by the CDS 106 to manage delivery of assets by the UEDs 102 and provides information useful for billing and analysis. The CDS 106 and BDMS 108 may be embodied in logic executed on one or more platforms, e.g., web servers, and may run at least in part on the same machines or on different machines. While the CDS 106 is referred to as a "cloud" decisioning system and may be implemented as a cloud-based system accessed via IP networks, it will be appreciated that neither the CDS 106 nor other systems referenced herein are limited to a specific network environment.

The illustrated BDMS 108 intakes information concerning household tags, break inventory, and orders. The household tag information may include the classification parameters noted above for each household or individual members of households. At least the Invidi I, Invidi II, Classifier, Limited Resource, Multicast and Third-Party Database cases referenced above describe systems that distinguish between household members in this regard. The household tag information may also include location information associated with the user, such as an address of the user or current location of the UED 102. This is described at least in the Location case. This information can be used by the CDS 106 to match the UEDs 102 and/or individual users of the UEDs 102 to the targeting constraints for individual assets (e.g., male, age 21-34, with an income of at least $50,000). This information may be obtained from a variety of sources, including third party databases (such as those of credit agencies such as Experian™) and logic associated with the UEDs 102 and may be used in combination with information of customer databases of network providers (e.g., the cable or satellite TV provider).

The break inventory information identifies at least particular upcoming ADOs that will be managed by the CDS 106. As noted above, ADOs may be spots in commercial breaks on particular television channels; product placement, background advertising, or shoppable content opportunities within programming; television crawls or pop-ups; internet/IP advertising or other opportunities. An important category of ADOs that can be managed by the CDS 106 in the context of television networks is asset spots including commercial breaks and ICA opportunities. In this context, it may be the case that only certain asset spots are designated by the appropriate stakeholders (e.g., programming networks, local affiliates, etc.) as having assets that may be inserted/replaced or are otherwise available to be managed by the CDS 106. Those spots may be identified in the break inventory information. The ADOs identified in the break inventory information may also include ADOs of, for example, on-demand programming. In such cases, the break inventory information may not identify the ADO by time (which may not be known) but by another index identifying the relevant ADO (e.g., it may be known that the on-demand content includes three identified breaks, and an ADO of interest may be identified as the second break). Thus, the break inventory information may identify individual ADOs by reference to programs, channels, times, other break indices, etc. Such information may be obtained from data systems of programming networks, network providers or others.

The order information will generally include information defining asset campaigns. As further described above and below, as well as at least in the Invidi I, Invidi II, and Third Party Database applications, such information may relate to delivery constraints such as targeting parameters (e.g., demographics of the target audience), channel or program exclusions, proximate asset exclusions, specified channels or programs, specified times and dates (or ranges thereof), frequency of delivery (e.g., how often an asset may be delivered to a particular user), pacing (at what pace should the total number of impressions be fulfilled, e.g., 10 impressions per week), total number of impressions (e.g., how many times an asset may be shown to a particular user), sequencing or other prerequisite information (e.g., asset B should only be shown after asset A has been delivered five times, or asset B should only be shown after asset A was delivered/interacted with on the internet), other contingencies (e.g., show this asset in the event of a particular outcome of a sporting event or in certain weather conditions), or other constraints. Though the noted applications generally describe this functionality in relation to addressable assets for commercial breaks, it will be appreciated that such functionality can be used to deliver programming segment versions in ICA contexts to the extent applicable. This information may be obtained at least in part from a contracting platform where asset providers or others enter asset delivery requests. Additional information may be obtained from other network platforms and operators having access to the relevant information.

As noted above, the programming including defined programming segments, that are replaceable with programming segment versions including selected ICA content, can be provided via various distribution networks implementing various distribution modes including streaming, cable or satellite TV, over-the-air TV, wireless, and other distribution networks/modalities. The programming segment versions may be inserted at a user equipment device or remote network platform and may be provided via addressable and/or non-addressable delivery systems (e.g., product placement may be implemented with content that varies based on a designated market area). As further noted above, delivery of the ICA content may be controlled and monitored via a platform that is independent of the distribution network.

Advertisers and distribution networks can interact in relation to distribution of ICA content as described herein via a centralized media distribution platform as described U.S. Pat. No. 11,451,848, entitled "Mediahub for Controlling and Monitoring the Distribution of Targeted Assets," which is incorporated herein by reference. Such a system enables advertisers to place a single order for media distribution that is allocated and distributed across multiple distribution networks/modalities via the centralized platform and may include addressable and/or non-addressable delivery. The centralized platform may be implemented in connection with the contracting platform 120. In the ICA context, the available inventory (e.g., identified by programming networks, programming content owners, or other stakeholders) includes programming segments and/or ICA opportunities associated with particular programming that can be distributed via multiple distribution networks/modalities. The asset providers may be advertisers or others who work with providers of content versioning products to provide the programming segment versions including the ICA content. The asset providers may specify targeting parameters for assets, e.g., programming segment versions or ICA content.

The centralized platform can receive an asset delivery request for an asset that defines a distribution campaign, e.g., including a campaign timeframe, targeting parameters and distribution constraints, total number of desired impressions, frequency, pacing, and other information. The platform can then match the asset and delivery request to inventory and audiences to devise a distribution plan for fulfillment of the campaign. In certain implementations, distribution orders may be transmitted to distribution networks distributing the programming and those orders may be accepted or rejected. In any event, the platform can monitor delivery of the asset across the distribution networks via delivery reports and adjust delivery as necessary to fulfil the campaign. The platform can also generate reports for billing or analysis of campaign effectiveness.

The BDMS 108 may also receive report information from the CDS 106 and output information to interested parties. The output report information may be the same as the report information received from the CDS 106 or may be processed, e.g., aggregated, condensed, edited, sorted, supplemented, sanitized in relation to privacy concerns/rights of the receiving party, and/or selected responsive to a query. The CDS 106 receives reports from devices 102 across one or more networks related to asset delivery. As set forth herein and at least in the Invidi I, Invidi II, Asset Skipping, and RFI cases, such reports may indicate what asset was delivered and for what ADO it was delivered (e.g., channel and time), and may also provide information concerning incomplete deliveries (e.g., asset skips, tune-aways, mutes, etc.), user presence and engagement, active engagement (e.g., requests for information or clicks), subsequent purchasing behavior, or the like. The CDS 106 may aggregate this information, combine this information with other data (e.g., subsequent purchasing data, network data, or click stream analysis data) or otherwise process the data before forwarding report information to the BDMS 108 or such processing may be implemented at the CDMS or other platform.

The reports provided to the CDS 106 and output by the BDMS 108 may be used for a variety of purposes. For example, the reports may be used to determine the total number of impressions delivered, and the break-down of impressions for different channels and ADOs for purposes of billing asset providers and sharing revenues. In addition, the reports may be used to determine the extent to which different asset delivery requests have been fulfilled to inform subsequent delivery decisions by the CDS 106. The reports including, for example, the number of asset skips and tune-aways, may be provided to asset providers and others to analyze asset effectiveness. In this regard, audience classification information, for particular users or aggregated, may be provided with the reports so that the recipient can determine what types of users skipped assets or tuned-away. The reports may also be provided to various other researchers interested in behavior patterns of network users.

As will be appreciated from the foregoing discussion, the CDS 106 is operative to make decisions concerning what assets will be delivered at the UEDs 102, 104 in connection with ADOs. FIG. 1 illustrates an exemplary network architecture where the CDS 106 is independent of the network insertion and delivery equipment. In particular, the broadcast content stream is delivered to the UED 102 by a digital content management (DCM) system 110 and certain assets are separately delivered to the UED 102 by the asset download network (ADN) 112. Neither the DCM 110 nor the ADN 112 is directly controlled by the CDS 106 in the illustrated system 100, nor is the CDS 106 dependent upon the specific identification of the DCM 110 and ADN 112. As will be discussed below, this allows the CDS 106 to remain independent of the network of the UED 102 such that the CDS 106 can operate across networks.

In the case of the illustrated broadcast television network, the broadcast content stream may include multiplexed television channels, delivered by cable or satellite, and assets. In the latter regard, for example, only certain asset spots on certain channels may be designated for replacement with assets as controlled by the CDS 106. Those spots may be identified by cue messages inserted into the broadcast content stream signifying to the UED 102 that an ADO is coming. Such cues may be provided shortly before, e.g., a few seconds or less prior to, the spot at issue. The remaining spots generally would not be identified by cue messages and would be indistinguishable from the surrounding programming stream from the perspective of the UEDs 102. Even the spots identified by cue messages as being available for asset insertion at the UEDs 102 may have default assets included in the broadcast content stream for more efficient bandwidth usage and reduced processing (e.g., an asset expected to be appropriate for a large segment of the audience may be selected as the default asset so that device implemented asset substitution is minimized).

The DCM 110 may be embodied in satellite network or cable network distribution platforms such as headend equipment, node equipment, or the like. The DCM 110 receives the broadcast content from various sources and multiplexes the content for transmission to the UEDs 102. The DCM 110 also includes the noted cue messages in the broadcast content stream. In this regard, the DCM 110 receives information identifying the relevant ADOs from the break data server 114. For example, such information may identify specific spots on specific channels that are available for asset replacement under control of the CDS 106. The break data server 114 obtains inventory information from the BDMS 108 concerning these ADOs.

The ADN 112 has access to stored assets that can be downloaded to the UEDs 102. For example, the ADN 112 may store media files for all asset options that may be delivered by the UEDs 102. Those files may be provided, for example, by asset providers, programming providers, or agents thereof. In response to a request from a UED 102, for example, including identifiers for designated assets, appropriate media files may be downloaded to the UED 102 for storage in storage 103 of the UED 102. The ADN 112 may be embodied in one or more servers that communicate with the UEDs 102 via a data network such as the internet.

In operation, the BDMS 108, from time-to-time, sends updated household tag, orders, and inventory information to the CDS 106. This may be done periodically, otherwise on a scheduled basis, as updates occur, or on another basis. Based on this information, the CDS 106, in the illustrated system 100, instructs the UEDs 102 as to what assets to store. For example, in a multi-member household, the CDS 106 may compare tag information for each household member to targeting constraints for each asset (as indicated by the orders information) to identify a list of assets that may be played at the UED 102. Such lists may be forwarded to the UEDs 102 on a periodic or other basis and used by the UEDs 102 to select assets to be stored for potential playback at a later time. The assets may be identified in the list by codes or other identifiers adequate to identify the assets.

The manner of storing the assets at the UED 102 can vary depending on the network implementation. For example, if assets are transmitted to the UEDs via a broadcast protocol, it may by convenient to transmit all assets to all UEDs 102 within a given network subdivision and then instruct each UED 102 to only store assets on its list and discard others to save storage space. The illustrated IP-based system is advantageous in that each UED 102 can request and receive, from the ADN 112, only the assets on its list. It should be noted that, while convenient and practical, it is not necessary that the assets be provided ahead of time and stored versus being transmitted in real-time at an ADO. Assets may be transmitted at play time where bandwidth and processing capabilities allow.

However, in the illustrated implementation where assets are provided to the UEDs 102 ahead of time, the operation of the system 100 proceeds by having the UED 102 request a playlist. In this regard, the playlist may be different from the list of assets to store for a number of reasons. First, the CDS 106, which may be independent of broadcast network, does not necessarily receive and forward to the UEDs 102 all information for each asset concerning asset delivery constraints, e.g., targeting constraints, network, and programming constraints, etc. Accordingly, while the UED 102 has assets available, it does not necessarily know what assets are appropriate for a given ADO. Moreover, in a multiple member household where assets are stored for different household members, the UED 102 may not know which member or members are present for receiving assets. That is, depending on the implementation, the UED 102 may or may not have logic for determining which users are present. If it does, this information may be provided to the CDS 106 or may potentially be used for at least partially autonomous asset selection by the CDS 106. The illustrated implementation, however, allows for delivery of addressable assets, including delivery of individually targeted assets in a multimember household, without requiring logic at the UED 102 for identification of a current user. Such identification may be performed by the CDS 106 based on the household tag information.

The illustrated CDS 106 also does not necessarily know when an ADO is about to occur at the UED 102. The CDS 106 does not necessarily know if the UED 102 is turned on, what channel it is tuned to and, even if it had access to such information, does not necessarily know when breaks will occur or what spots are available for asset replacement. Moreover, though the illustrated CDS 106 has instructed the UED 102 as to what assets to store, the CDS 106 does not necessarily know what assets are available to be played at the UED 102. The UED 102 may not yet have stored the assets as instructed, the assets may have subsequently been deleted for various reasons (e.g., change in household composition, changes in constraints or preferences, storage limitations, etc.), or the assets may otherwise be unavailable for the ADO at issue.

Accordingly, in the illustrated implementation, the UED 102 informs the CDS 106 what assets are available and requests a playlist. This may be done in a single message between the UED 102 and the CDS 106 or in separate messages. For example, the assets available may be updated continually as assets and stored or deleted. However, in one implementation, the UED 102 reports what assets are available at the same time as it requests a playlist. The request may be for a single ADO, a set of related ADOs, or otherwise for multiple ADOs. Preferably, the request is for a single or small set of ADOs and is made close in time, e.g., seconds or fractions or seconds, before the beginning of the ADO. It will be appreciated that requests made close to the time of the ADO are most useful due to channel changes, the potential that the UED 102 will be powered off, etc.

The request may include, in addition to identifying what assets are available at the UED 102, information identifying the ADO. For example, the information may be sufficient to enable the CDS 106 to select assets taking into account any delivery constraints (e.g., program or channel inclusions/ exclusions) and campaign information (e.g., frequency and overall impression count). It will be appreciated that monitoring of information related to asset selection decisions could be distributed in various manners between the CDS 106 and the UEDs 102 (e.g., the UEDs 102 could count total number of impressions delivered for an asset). In the illustrated implementation, substantially all aspects of monitoring and decision-making are executed at the CDS 106. This reduces the need for specialized logic/resources at the UEDs 102, allows the system 100 to be deployed without upgrading the UEDs 102, and allows the CDS 106 to operate independent of the specific attributes of the UEDs 102 which facilitates operation across all UEDs of a network and across networks.

The CDS 106 then provides a list of one or more assets to play at one or more ADOs. In the simplest case, this may be an instruction to play a specific asset (e.g., identified by a code or other identifier) at the immediately ensuing ADO. In an ICA context, the asset may be a programming segment version including the appropriate ICA content. However, it is also possible for the playlist to include alternate assets for different channels/ADOs (e.g., in case of channel change) or alternate assets for a single ADO, or parameters for controlling the UED 102 to select the asset. In any case, the UED 102 plays an asset from the storage unit 103 in response to receiving the playlist. For example, the UED 102 may commence playback from storage 103 based on a detected cue message in the broadcast stream.

The UED 102 and/or CDS 106 may then monitor delivery of the asset at the UED 102. It is possible to implement the system 100 such that, once asset delivery begins, it continues regardless of channel charges, fast-forward commands (e.g., in the case of on-demand or time-shifted contexts) or the like. However, in one implementation, the UED 102 monitors asset skips or tune-aways. This may be done, for example, by monitoring the click-stream from a remote control device or by directly monitoring (continuously or intermittently) the content being played, e.g., using Automatic Content Recognition (ACR). The UED 102 or CDS 106 may also monitor other information such as user presence and engagement, muting, volume, any requests for information entered in relation to an asset or the like. Some or all of this information may be provided in a report sent from the UED 102 to the CDS 106. Such reporting is described at least in the Invidi I, Invidi II, and Asset Skipping cases. For example, a report may include, for each ADO, an identification of the asset delivered, an indication of the time of delivery, an indication of the channel or program in connection with which asset was delivered and, optionally, additional information such as completeness of asset delivery and presence/engagement information. These reports may be sent for each ADO or aggregated for periodic transmission. Moreover, the reports may be collected for each ADO for each UED 102, or a statistical reporting process may be implemented. In turn, the CDS 106 may provide report information based on the reports from the UEDs 102 to interested parties as described above.

While much of the preceding discussion has treated conventional advertising breaks and ICA opportunities as being the same, there are some considerations that are specific to using programming segment versions to deliver addressable ICA content. Unlike traditional addressable advertising breaks, where selected ads may have no relationship to the program, modifiable content avails for ICA content can only be replaced by specific ICA variations which, for addressable advertising, consist of modified versions of the base content (programming segment). A content position identification (CPID) for the ICA opportunity can be specified in the orderlines for the variant addressable versions of the ICA content in order to ensure that the viewer sees the programming segment with the correct ICA content. For VOD inventory, modifiable content areas can be indicated in the content metadata.

The inventory information for ICA opportunities can also handle the business arrangements in terms of repeat broadcasts. Advertisers might buy their placement on the media (e.g., a program) forever or only for a certain length of time. In this regard, a content provider 122 can include a modifiable content ID in the linear inventory every time the program is scheduled, as long as the business arrangements are in place, but discontinue doing so when the rights have expired. Likewise, the VOD content metadata should accurately reflect the time-based business arrangements for the addressable ICA inventory.

Orders and orderlines can be entered via a contracting platform 120 running an ordering system such as the INVIDI Conexus™ Order Entry System. In addition to the support for entering orders for conventional addressable ads, it is possible to enter separate orders for ICA content. These orders specify different orderlines for each programming segment version. They include the CPID that matches the location of the ICA content from the above inventory. For each version orderline, the advertiser would specify the asset file name of the version and its associated targeting.

The inventory also supports a campaign management UI to specifically handle ICA orderlines and enforce the correct connection between orderlines and the corresponding content. Orderlines can be entered in the actual context of the content location and avoid any potential errors from manually matching the content position ID across inventory and orderlines.

As discussed above, certain solutions have been developed to generate programming versions including digital content replacement to integrate ICA content, such as the Digital Brand Integration (DBI) products of Whisper Media. Such products may be implemented in the ICA versioning platform 124 of the illustrated system 100, which provides versions of defined programming segments including targeted ICA content. When an ICA partner creates ICA content overlays for a specific programming segment, it will create several versions of this content, one for each of the targeted variants the advertiser wants to reach with a different message. While the resulting content files contain both program content and ads, they will be distributed to the playout system (for linear) and CDN (for OTT) using the same distribution method as conventional advertisement asset files. Unlike conventional addressable ads which are typically fixed lengths, such as 15, 30, or 60 seconds, the ICA programming segment versions can be a wide variety of lengths depending on the content and how long the scene provides for an ICA opportunity. The content provider 122 and ICA partner may ensure that the transition point between original program content and the programming segment versions is aligned so that when the packager creates the small video chunks for the manifest that the manifest manipulator can swap in the programming segment versions seamlessly.

For broadcast transmissions, the content streams coming from the content provider 122 can now contain triggers for the ICA avails (associated with replaceable programming segments). These can be SCTE 35 cues specially marked as ICA avails that match the SCTE 224 modifiable content inventory data above. For VOD distribution of programs, metadata can be provided indicating the location of the ICA avails using a format such as CableLabs Metadata 1.1.

The CDS 106 provides playlists to a playout system (e.g., set top box 102) instructing it what ads to play when cues are received. Now the playlist will also include any ICA version that needs to be inserted when the cues for ICA avails are received. For OTT devices, the manifest manipulator will treat the ICA cues the same way as cues for ad breaks by making an ad decision request to the system 100 and, when it gets the VAST responses, replacing the original content (default programming version) with ICA content (targeted programming segment version) that was selected based on the viewer's targeting.

Impression counts and other reporting will now include playout data for addressable ICA content deliveries. Much of the reported information is the same as for conventional addressable ads: time and network of impression, number of viewers, and length of time viewed. Rather than reporting a break ID, in the case of ICA content deliveries, the user equipment device 102 (or other insertion device) may report a CPID. The impressions for OTT can be based on individual device stream insertion, while the impressions for headend insertion can report viewer count metrics derived from panel data.

Current ICA implementations offer no device-specific reporting or attribution, but that level of reporting detail will be available, including when addressability is added, using this infrastructure. The current ICA measurement is panel-based, providing estimates of the total number of viewers of the ICA-enabled program, but with addressability, there is a need for more specific data for viewer counts in each of the targeted demographics of the addressable programming segment versions/ICA content deliveries. For headend insertion, the reports may still be based on panel data, but it would be available by region, providing individual counts for each region reached by a separate targeted version. In OTT environments, the addressable ICA system will be able to provide device-specific counts, allowing features such as being able to tie back attribution data to the addressable ICA impressions. Although the description of the ICA specific infrastructure (e.g., elements 120, 122, 124) is not repeated below in connection with FIGS. 2-4, it will be appreciated that similar elements may be included in those contexts.

While much of the preceding discussion has focused on asset delivery in the context of linear, broadcast content (commercial breaks of ICA advertising), it will be appreciated that the system 100 is applicable in other contexts such as on-demand, time-shifted playback at the UED 102, linear or on-demand, streaming, etc. In any such contexts, ADOs can be detected by the UED 102 based on cue messages or other means. Assets (in the appropriate format) can be stored and delivered as described above, including playlist requests, reports, etc. Again, as the CDS 106 need not be integrated into the content delivery systems, much of the functionality is independent of the ADO context.

B. Multiple Devices

Figure 2:
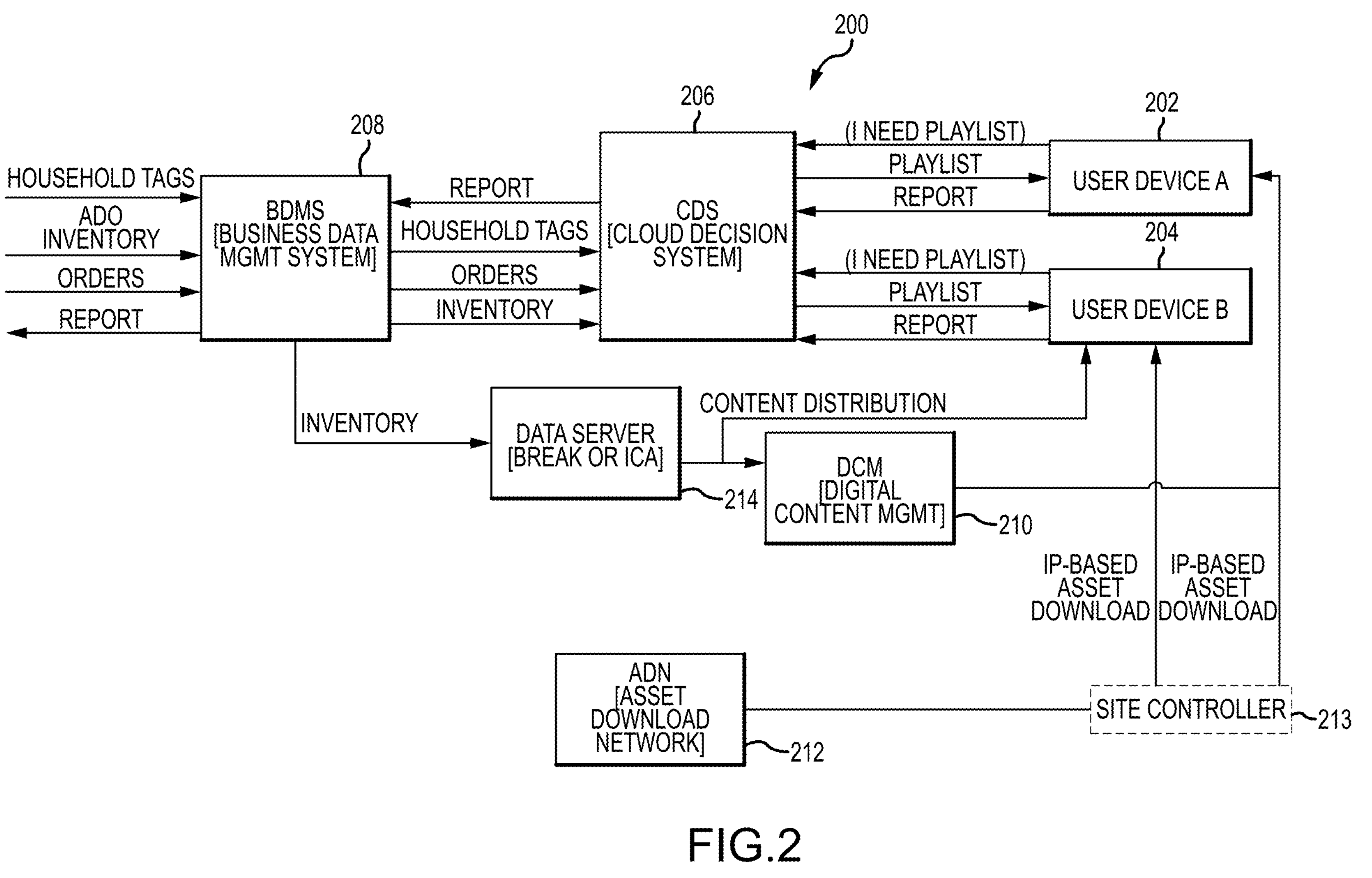
FIG. 2 is a schematic diagram of an alternative implementation of an addressable asset system in accordance with the present invention.
Figure 3:
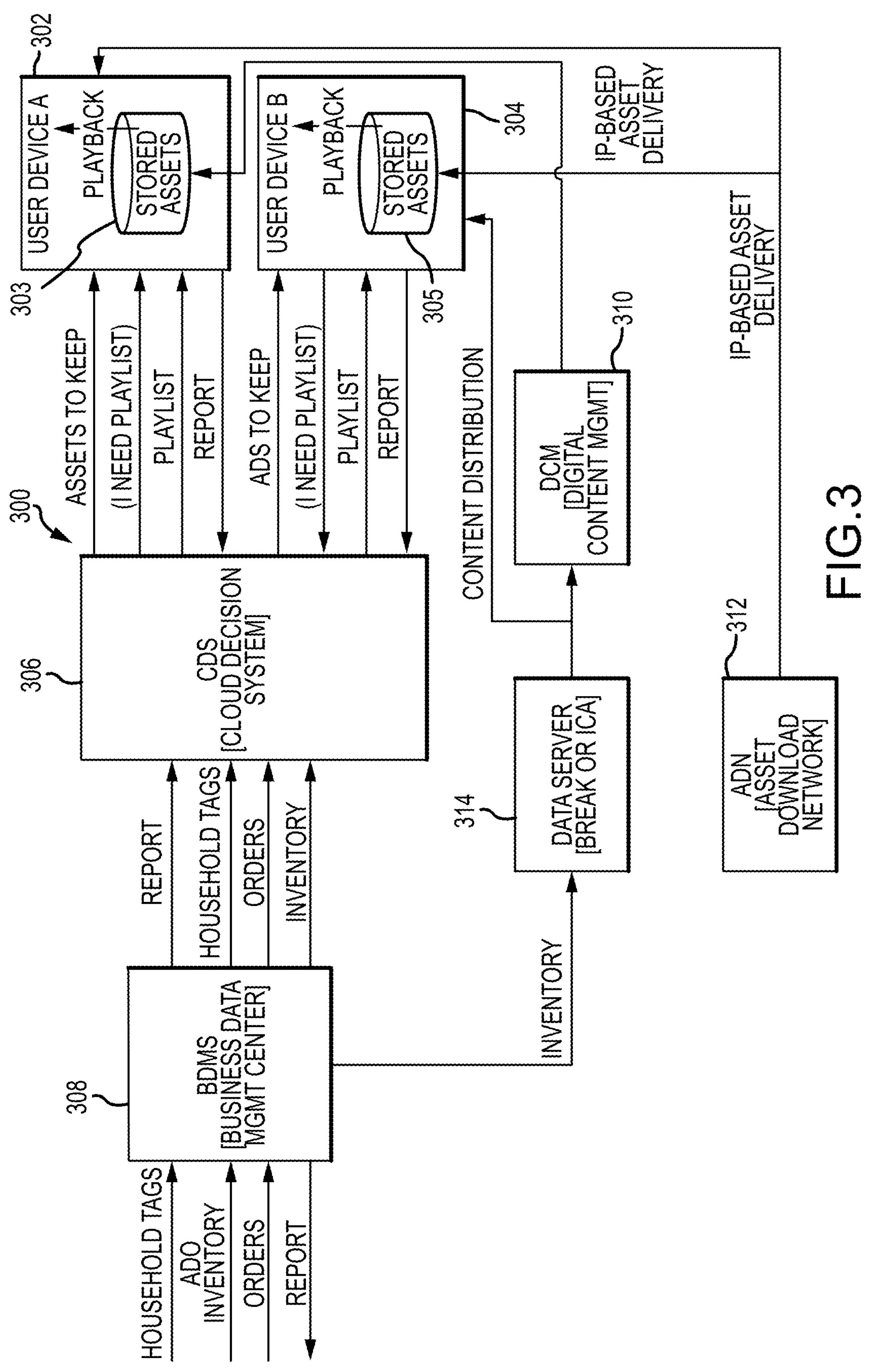
FIG. 3 is a schematic diagram of a still further alternative implementation of an addressable asset system in accordance with the present invention.

FIGS. 2-3 illustrate alternative systems 200, 300 for implementing addressable asset delivery where asset delivery can be managed across multiple UEDs 202, 204 and 302, 304. Although two UEDs 202, 204 and 302, 304 are shown in each case, delivery of assets can be managed across substantially any number of UEDs subject to practical limitations. The UEDs 202, 204 and 302, 304 may be the same or different, may be in the same location or different locations, and may be part of the same network or different networks. The present embodiments focus on the case where the UEDs 202, 204 and 302, 304 are in the same location and are part of the same network, e.g., different televisions in the same residence. It will be appreciated that this is an important case as a user may receive assets via different televisions within a household and it may be useful to manage asset delivery, including frequency and total number of impressions, across those devices.

The structure and functionality of the systems 200, 300 can be substantially the same as described above in connection with FIG. 1 except for the structure and functionality specific to multiple devices. In this regard, the systems 200, 300 include BDMSs 208, 308, CDSs 206, 306, break data servers 214, 314, DCMs 210, 310, and ADNs 212, 312, all substantially as described above.

The principal difference between the systems 200, 300 of FIGS. 2 and 3 is that the UEDs 302, 304 of FIG. 3 are each depicted as having asset storage units 303, 305 whereas the UEDs 202, 204 of FIG. 2 do not. There are a number of contexts where assets may not be stored locally on each UED 202, 204. For example, storage may be provided by a single, optional site controller unit 213 that is networked to the UEDs 202, 204. For example, the site controller 213 may be located at the same location as the UEDs 202, 204 (e.g., at the same residence) or at another location and may be embodied as an external storage unit, a master set top box, or the like. Local storage at each device 202, 204 also may not be necessary in on-demand contexts (e.g., if the CDS 206 directs the on-demand platform to insert assets) or where replacement assets are delivered by the ADN 212 in real-time. It will be appreciated that, in contexts where the UEDs 202, 204 do not have local storage units, the UEDs 202, 204 will not receive a list of assets to store (though a site controller 213 may get a corresponding list applicable to the UEDs 202 and 204). The UEDs 202, 204 may still request playlists and provide reports.

There are a number of housekeeping functions that can be addressed to manage asset delivery across multiple UEDs 202, 204 or 302, 304. First, the CDS 206, 306 can maintain lists of related UEDs 202, 204 and 302, 304, e.g., lists of devices designated for collective management. In this regard, each UED 202, 204 and 302, 304 can be identified by a MAC address or other identifier and those identifiers can be used to compile the lists and used in communications (e.g., playlist requests, reports, etc.). In cases where asset delivery is managed for multiple individuals associated with one or more devices, individuals may also have identifiers for use by the CDSs 206, 306 (this would also be the case even for managing a single device). The individuals may be identified by the CDSs 206, 306, e.g., based on the household tags and network usage information, and will not necessarily need to be identified in playlist requests, reports, etc.

In any case, asset deliveries or partial deliveries on either device 202, 204 or 302, 304 can be reported to the CDS 206, 306 and recorded against the collectively managed entity defined in terms of a user or users and multiple devices. For example, if a given user received an asset three times via UED 202 and two times via UED 204, the CDS 206 may record that the user has received the asset five times. These collectively analyzed reports can be used to manage compliance with campaign specifications such as frequency and total number of impressions.

C. Multi-Network Environment

Figure 4:
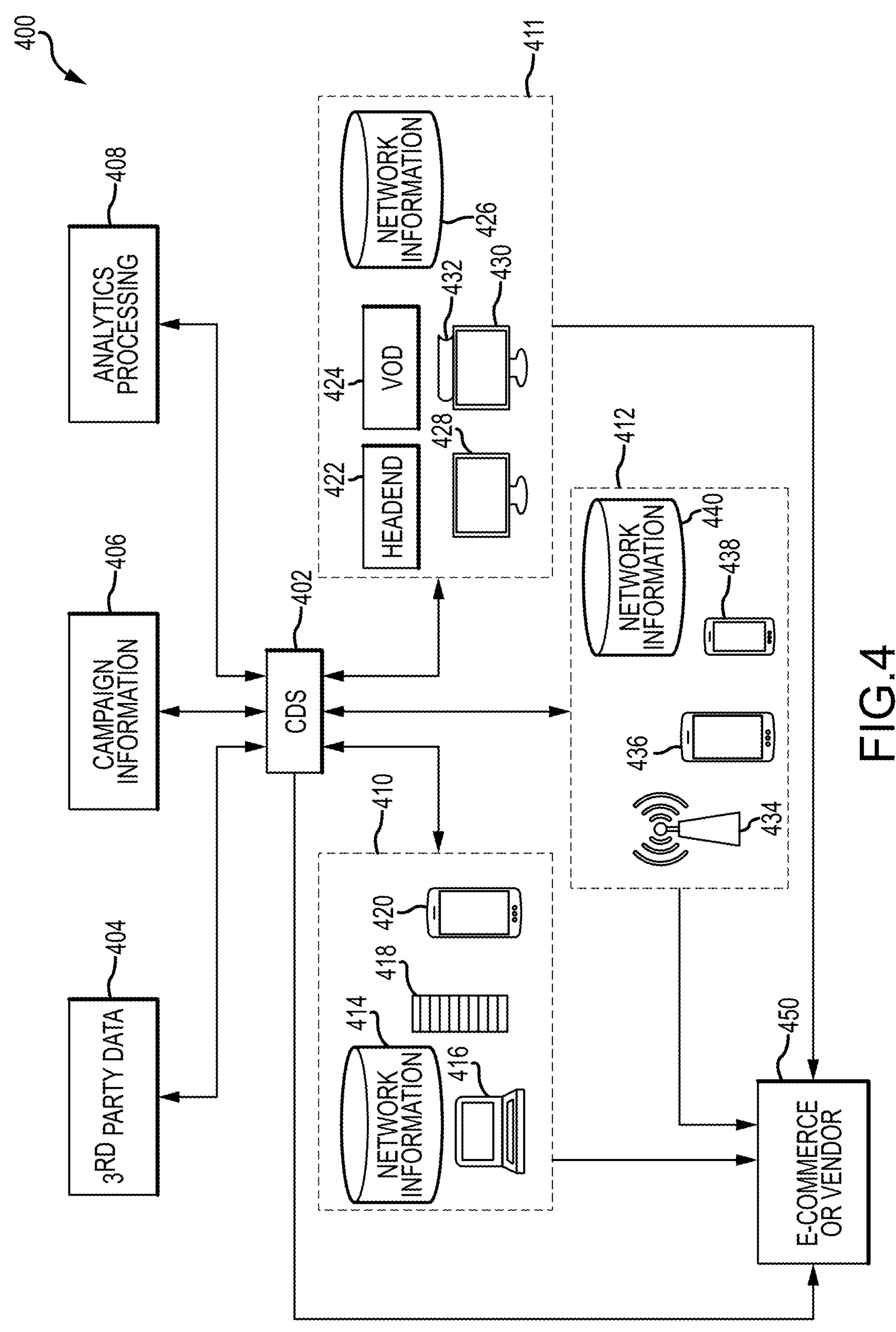
FIG. 4 is a schematic diagram of a decisioning system in a multi-network environment in accordance with the present invention.

FIG. 4 illustrates and addressable advertising system 400 that can be used to manage delivery of assets across multiple devices and multiple networks. The illustrated system 400 includes a cloud-based decisioning system (CDS) 402 that manages decision making for asset delivery across multiple UEDs. The illustrated CDS 402 receives information from a variety of sources including a third-party database 404 and a campaign information platform 406 and can provide output information to an analytics processing platform 408. The CDS or individual UEDs may also communicate with an e-commerce platform 450, for example, in connection with shoppable content of an ICA or other ADO. For example, the platform 450 may be accessed by entering a QR code, URL, link information or the like via the UED or a second screen device. The CDS 402, in turn, controls asset delivery with respect to UEDs in multiple networks 410-412.

The third-party database 404 can provide a variety of information that is useful in targeting assets to particular subscribers and evaluating the effectiveness of assets. For example, the third-party database 404 can be accessed to obtain demographics information, income information, purchasing behavior information or the like for individuals and households. This information may be indexed to a residence address or an identification of an individual. This information may be used in connection with network information 414, 426, 440 from the networks 410-412 to correlate the information from the third-party database 404 with particular users or households of the networks 410-412.

The information from the third-party database 404 may be used to match individual users or households to targeting constraints of assets, or to track activities subsequent to asset delivery to analyze asset effectiveness. For example, information concerning income, brands of products purchased, age, gender, data network behavior, occupation or the like may be used to match users or households to targeting constraints of assets prior to asset delivery. Information from the third-party database 404 concerning purchasing decisions, website visits, or other behavior may be used to track asset effectiveness after delivery.

Although a single third-party database 404 is shown for purposes of illustration, such information may be obtained from multiple data sources associated with multiple entities. Examples include credit agencies like Experian™, sources of website traffic data, loyalty programs of retail outlets, and other customer information databases. For example, an asset provider, such as Ford Motor Company, may seek to target assets to current Ford owners on the networks 410-412. Delivery of the assets on the networks 410-412 may then be tracked to achieve a desired level of campaign fulfillment. Thereafter, behavior of the network users may be tracked via the third-party database 404 to determine how many users of the networks 410-412 who receive the asset in question purchased Ford products or third-party products. In this manner, asset delivery across the networks 410-412 is precisely targeted and tracked, and subsequent behavior is analyzed to close the loop concerning asset effectiveness.

The CDS 402 also receives campaign information 406 regarding campaigns for various assets. As discussed above, campaign information may include targeting constraints defining the targeted audience as well as campaign constraints defining various parameters of a campaign such as the date range of the campaign, the desired networks or programming associations of the asset, the frequency of asset delivery, pacing, and the total number of impressions to be delivered. In the context of the illustrated system 400, such campaign information may also define campaign constraints specific to the multi-network environment. For example, the campaign information 406 may specify that, for example, a broadcast network asset should only be delivered after a particular user has received an internet asset, or that a particular user should receive an internet asset a certain number of times, a wireless asset a certain number of times and a broadcast network asset a certain number of times. The CDS 402 is operative to monitor such deliveries across networks to ensure campaign fulfillment.

The analytics processing platform 408 can receive information related to asset delivery for a variety of purposes such as billing, revenue splitting and analysis of asset effectiveness. In this regard, the CDS 402 can provide information to the analytics processing platform 408 periodically or in response to queries. For purposes of billing and revenue splitting, the information provided by the CDS 402 to the analytics processing platform 408 may include total number of impressions, an identification of the networks for which impressions were delivered, an indication of channels, websites, or other associations, or any other information relevant to billing and revenue sharing. In the case of analytics processing for asset effectiveness, the platform 408 may query the CDS 402 to obtain a variety of information related to a particular asset or set of assets. Appropriate security protocols may be implemented to ensure privacy and to ensure that information is only accessed by authorized parties.

As noted above, the CDS 402 can manage and monitor asset delivery across multiple networks 410-412. Many different types of networks may be managed and monitored in this regard. For purposes of illustration, FIG. 4 shows three networks; a data network 410, a broadcast network 411, and a wireless network 412. For example, the data network 410 may include computers 416, servers 418, and tablets 420 among other types of data terminals. The broadcast network 411 may include Smart TVs 428, TVs 430 associated with set-top boxes 432, headend equipment 422, and video on-demand equipment 424. The CDS 402 may communicate with any of these components to control and monitor asset delivery in the network 411.

The illustrated wireless network 412 may include cell cites 434, tablets 436, and telephones 438. The CDS 402 may also communicate with a wireless location platform of the network 412 or separate therefrom in order to obtain information concerning the locations of wireless units.

It will be appreciated that the same asset may be delivered across any of the networks 410-412. For example, a full video asset may be inserted into a broadcast content stream or delivered via streaming in the data network 410 or wireless network 412. In addition, related assets may be delivered via the various networks 410-412. For example, an asset provider may provide three related assets including a full video asset for delivery in the broadcast network 411, a panel asset for delivery via the data network 410, and a mobile unit optimized asset for delivery via the wireless network 412. The CDS 402 can recognize the appropriate asset based on the identification of the UED submitting a playlist request. The illustrated system 400 thus allows for management of a single campaign across multiple networks 410-412. In addition, the illustrated system 400 facilitates operation of a single contracting platform to reach multiple networks 410-412.

Figure 5:
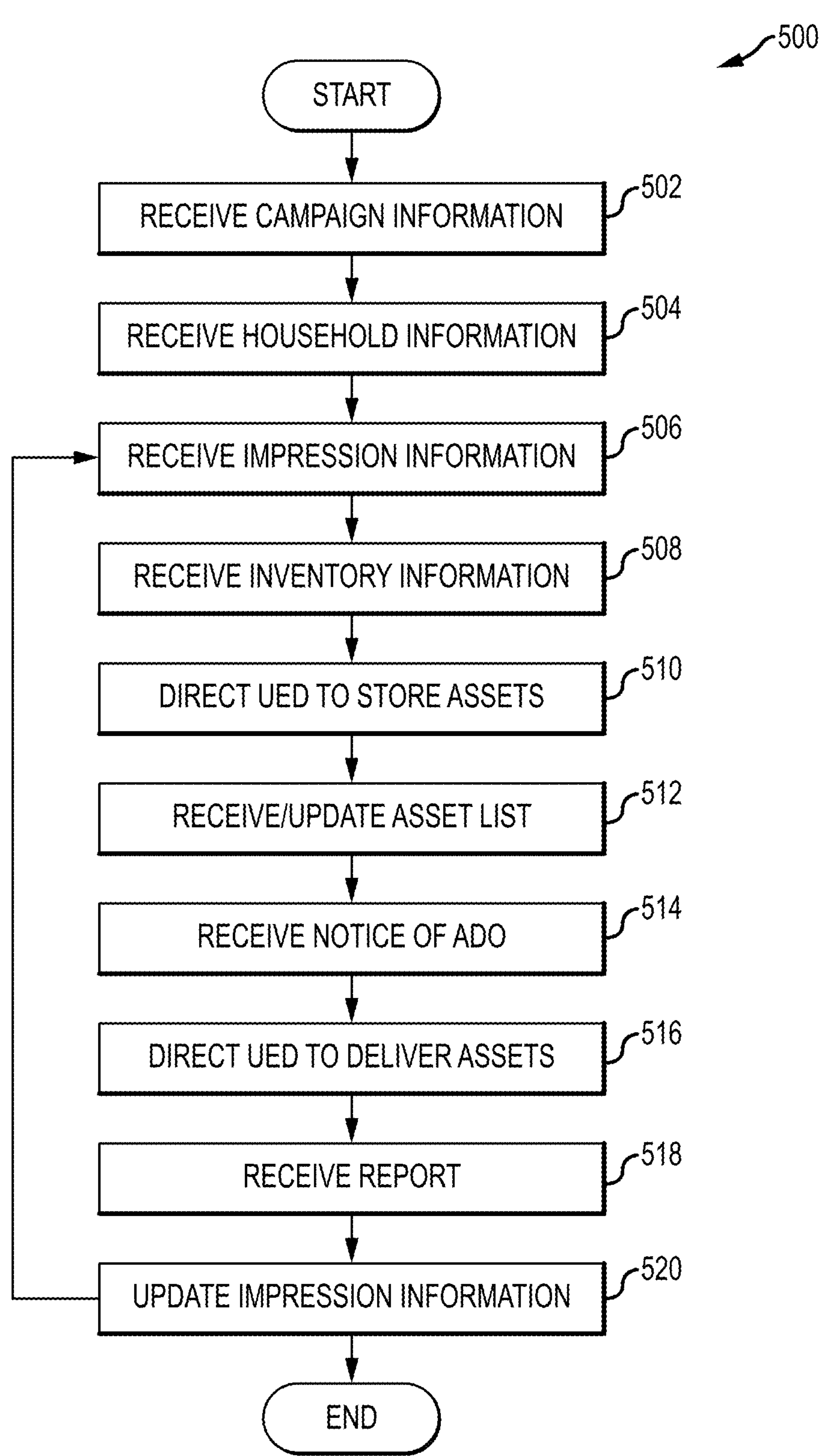
FIG. 5 is a flow chart summarizing a process for managing asset delivery across multiple devices, multiple networks and/or multiple modalities.

FIG. 5 is a flow chart illustrating a process 500 for managing and monitoring asset delivery in accordance with the present invention. The illustrated process 500 is initiated by receiving (502) campaign information defining a campaign for delivery of an asset or a set of assets. For example, the campaign information may be entered via one or more contracting platforms. In a preferred implementation, a single contracting platform can be utilized to enter information defining a single campaign extending across multiple networks.

A cloud decisioning system as described above can receive this campaign information as well as receiving (504) household information. The household information provides information concerning a household or individuals within a household that can be used to match households or individuals to the targeting constraints of an asset. As described above, this may include demographics, income information, purchasing behavior and the like. The CDS may also receive (506) impression information for an asset. For example, the CDS may receive reports from UEDs. These reports may indicate that an asset was delivered or partially delivered to a particular individual, household, UED, or type of UED. This information may be used by the CDS to determine a level of fulfillment of a campaign and, therefore, whether the asset remains available for delivery to a given UED or user.

The CDS may also receive (508) inventory information. Such inventory information may relate to, for example, the ADOs that are available for asset replacement or insertion. In the context of a broadcast television network, the inventory information may identify particular spots (breaks or ICA opportunities) on particular programming networks where assets may be substituted into the broadcasting content stream. In the context of data networks or wireless networks, the asset delivery opportunities may relate to placement of video assets in streaming content, image-based assets on web pages, or other ADOs.

In certain implementations, the CDS may direct (510) the UED to store assets in advance of an ADO. As discussed above, storage units associated with particular UEDs or households in a broadcast television network may store assets that may be delivered in subsequent ADOs. Similarly, UEDs in data and wireless networks may be directed to store assets that will later be placed into asset placement spots of webpages or other content. In certain implementations, the CDS may occasionally receive and update (512) a list of assets that are available to be played at the UED. For example, as described above, individual UEDs of a broadcast television network may report to the CDS what assets are available to be played at the time that a playlist is requested. The CDS then receives (514) notice of an ADO. In this regard, a UED may contact the CDS to request a playlist for an upcoming ADO or set of ADOs. In response, the CDS may direct (516) the UED to deliver a specified asset. For example, the CDS may provide a playlist to the UED identifying one or more assets to be played in connection with one or more ADOs. After one or more assets have been delivered by the UED, the UED may provide and the CDS may receive (518) a report concerning asset delivery. The report may indicate the asset that was delivered, the time of delivery, whether delivery was complete, what channel, website, or other content the asset was delivered in connection with, and the like. The CDS can then update (512) impression information for the particular asset and for the particular user or UED that delivered the asset. The updated impression information can then be used to evaluate fulfilment of the asset campaign.

The implementations as described above in connection with the various embodiments can be used to support a number of use cases. A number of these use cases are set forth below for purposes of illustration. It will be appreciated that many other use cases are possible in accordance with the present invention.

The first use case, and perhaps the simplest use case, relates to managing and monitoring asset delivery via a single UED of a single network. This generally corresponds to the system shown in FIG. 1 above. In this case, the UED notifies the CDS of an upcoming ADO. In response, the CDS provides a playlist identifying an asset to be delivered in connection with the ADO. The UED then delivers the asset and reports delivery to the CDS. The CDS can track delivery based on the reports to determine a level of fulfilment of a campaign. While other architectures could be employed to track asset delivery, it will be appreciated that the noted architecture enables the CDS to manage and monitor asset delivery independent of the content delivery networks.

A second use case relates to managing and monitoring asset delivery across multiple devices of a single network. This generally corresponds to the embodiments described in connection with FIGS. 2-3 above. For example, this is useful to track delivery of assets to a single individual who used multiple UEDs in a single network, e.g., multiple televisions in a single household or multiple households of a network. In this case, the CDS can use stored information concerning relationships between UEDs and/or report information to determine collective information concerning impressions delivered via different UEDs of the network. For example, if a given user receives an asset three times on a first UED and two times on a second UED, the CDS can properly track that the user has received the asset a total of five times. Similarly, if each report includes time of delivery information, the CDS can ensure that the user receives the asset on different UEDs only in compliance with frequency constraints.

The system can also manage and monitor asset delivery across multiple UEDs of multiple networks. The system may monitor deliveries of the same asset (e.g., a conventional television commercial) or related assets (e.g., assets designated by an advertiser as related such as a television commercial and an ICA content). In this regard, for example, the CDS may identify deliveries of an asset or assets treated as a group to an individual on different UEDs in different networks (including assets delivered at the same or at overlapping times, e.g., in a two-screen consumption context such as simultaneous television and tablet use) based on stored information relating the UEDs and/or report information. In this manner, impressions delivered on the different UEDs of the different networks to a single user may be combined to ensure compliance with campaign constraints. For example, in the case of TV Anywhere programs, the CDS may determine that a user has received an asset twice in linear television programming and once more during program streaming on a tablet or laptop computer. Accordingly, the CDS may determine that the user has received three impressions for the asset. Similarly, the CDS may determine that a user has received an asset twice during linear television programming and once more via streaming in an unrelated network. Again, the CDS can combine these impressions to ensure compliance with campaign constraints.

The system can also be used to manage compliance with certain sequencing constraints concerning an asset or set of related assets. For example, an asset provider may specify that a first asset should be viewed a certain number of times, then a second asset should be delivered a certain number of times and then a third asset should be delivered a certain number of times. This may include related assets, e.g., the asset provider may specify that a conventional television commercial should be delivered prior to related ICA content. Asset delivery can be monitored by the noted system to ensure that the desired sequence is implemented.

As a further example, an asset provider may specify that a certain asset should only be delivered to television viewers (via a conventional television ad or ICA content) after a related, teaser asset has been delivered during an internet session or vice versa. The noted system can monitor asset delivery across networks to ensure the proper sequencing.

The foregoing description of the present invention has been presented for purposed of illustration and description. Furthermore, the description is not intended to limit the invention to the form disclosed herein. Consequently, variations and modifications commensurate with the above teachings, and skill and knowledge of the relevant art are within the scope of the present invention. The embodiments described herein above are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed:

1. A method for in-content advertising (ICA), comprising:

defining an ICA opportunity in a programming stream, said ICA opportunity comprising a first content portion, less than the whole, of each of a series of successive programming frames corresponding to a time period such that said ICA opportunity has an areal component, corresponding to said first portion, and a time component within said first time period;

defining a programming segment constituting a portion of programming content within said programming stream, said segment containing said ICA opportunity;

establishing a plurality of variants of said programming segment, each of said variants including different content embedded in said programming segment in said ICA opportunity and being associated with different audience targeting parameters;

obtaining classification information associated with one or more user equipment devices delivering said programming stream;

based on said classification information, selecting one of said variants;

inserting a trigger into said programming stream to identify said programming segment and said ICA opportunity, wherein said trigger identifies a position in said programming stream where said selected variant will play and said position identifies at least one of said areal component and said time component; and delivering, at said one or more user equipment devices, said programming stream including said selected variant.

2. The method of claim 1, wherein said programming stream comprises a programming stream of a broadcast network.

3. The method of claim 1, wherein said programming stream comprises one of a programming-on-demand stream and a data network stream.

4. The method of claim 1, wherein said selected variant is inserted into said programming stream at said one or more user equipment devices.

5. The method of claim 1, wherein at least one of said targeting parameters comprises one of location information for a desired audience, said location information relating to at least one of a location associated with an audience member and a location of a user equipment device and demographic information for a desired audience.

6. The method of claim 1, wherein said programming segment includes a plurality of ICA opportunities and ICA opportunities temporally overlap at least in part.

7. The method of claim 1, wherein said ICA opportunity relates to an object of said programming stream that occurs at multiple discrete times.

8. The method of claim 1, further comprising receiving, from an order entry system, orders with respect to ICA opportunities based on a position and a duration of said ICA opportunities.

9. The method of claim 8, further comprising operating said order entry system coordination with content providers such that appropriate triggers are provided in content streams of said content providers for identifying said ICA opportunities.

10. The method of claim 1, further comprising receiving reports concerning delivery of said programming stream including said selected variant.

11. The method of claim 10, wherein at least some of said reports are received from said user equipment devices.

12. The method of claim 10, wherein said reports provide information concerning a programming association of said selected variant.

13. A system for in-content advertising (ICA), comprising:

a processing system, including one or more processing platforms operative for:

receiving information defining an ICA opportunity in a programming stream, said ICA opportunity comprising a first content portion, less than the whole, of each of a series of successive programming frames corresponding to a time period such that said ICA opportunity has an areal component, corresponding to said first portion, and a time component within said first time period, said ICA opportunity being associated with a programming segment constituting a portion of programming content within said programming stream, said segment containing said ICA opportunity;

identifying a plurality of variants of said programming segment, each of said variants including different content embedded in said programming segment in said ICA opportunity and being associated with different audience targeting parameters;

obtaining classification information associated with one or more user equipment devices delivering said programming stream;

based on said classification information, selecting one of said variants;

inserting a trigger into said programming stream to identify said programming segment and said ICA opportunity, wherein said trigger identifies a position in said programming stream where said selected variant will play and said position identifies at least one of said areal component and said time component; and causing delivery, at said one or more user equipment devices, of said programming stream including said selected variant.

14. The system of claim 13, wherein said programming stream comprises a programming stream of a broadcast network.

15. The system of claim 13, wherein said programming stream comprises one of a programming-on-demand stream and a data network stream.

16. The system of claim 13, wherein said selected variant is inserted into said programming stream at said one or more user equipment devices.

17. The system of claim 13, wherein at least one of said targeting parameters comprises one of location information for a desired audience, said location information relating to at least one of a location associated with an audience member and a location of a user equipment device and demographic information for a desired audience.

18. The system of claim 13, wherein said programming segment includes a plurality of ICA opportunities and ICA opportunities temporally overlap at least in part.

19. The system of claim 13, wherein said ICA opportunity relates to an object of said programming stream that occurs at multiple discrete times.

20. The system of claim 13, further comprising an order entry system for receiving orders with respect to ICA opportunities based on a position and a duration of said ICA opportunities.

21. The system of claim 20, wherein said order entry system is operative in to provide appropriate triggers in content streams of content providers for identifying said ICA opportunities.

22. The system of claim 13, wherein said processing system is further operative for receiving reports concerning delivery of said programming stream including said selected variant.

23. The system of claim 22, wherein at least some of said reports are received from said user equipment devices.

24. The system of claim 22, wherein said reports provide information concerning a programming association of said selected variant.

* * * * *